United States Patent
Cole

(10) Patent No.: US 7,885,222 B2
(45) Date of Patent: Feb. 8, 2011

(54) TASK SCHEDULER RESPONSIVE TO CONNECTIVITY PREREQUISITES

(75) Inventor: Terry L. Cole, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 905 days.

(21) Appl. No.: 11/537,521

(22) Filed: Sep. 29, 2006

(65) Prior Publication Data

US 2008/0080411 A1 Apr. 3, 2008

(51) Int. Cl.
*H03D 3/00* (2006.01)
(52) U.S. Cl. .............. 370/328; 709/238; 455/452.2
(58) Field of Classification Search .......... 455/452.2
See application file for complete search history.

(56) References Cited

U.S. PATENT DOCUMENTS

| | | | |
|---|---|---|---|
| 5,870,685 A | 2/1999 | Flynn | 455/573 |
| 6,134,589 A | 10/2000 | Hultgren | 709/227 |
| 6,148,408 A | 11/2000 | Shimoda | 713/320 |
| 6,594,481 B1 | 7/2003 | Johnson et al. | 455/410 |
| 6,753,887 B2 | 6/2004 | Carolan et al. | 715/764 |
| 6,801,777 B2 * | 10/2004 | Rusch | 455/452.2 |
| 7,069,558 B1 * | 6/2006 | Stone et al. | 718/104 |
| 2002/0178044 A1 * | 11/2002 | Bicknell et al. | 705/9 |
| 2003/0135643 A1 * | 7/2003 | Chiu et al. | 709/238 |
| 2004/0073672 A1 | 4/2004 | Fascenda | 709/225 |
| 2004/0077341 A1 | 4/2004 | Chandranmenon et al. | 455/418 |
| 2004/0176023 A1 | 9/2004 | Linder et al. | 455/3.01 |
| 2005/0136920 A1 | 6/2005 | Rink et al. | 455/433 |
| 2005/0148332 A1 | 7/2005 | Buckley et al. | 455/435.2 |
| 2005/0216519 A1 | 9/2005 | Mayo et al. | 707/200 |
| 2005/0227692 A1 | 10/2005 | Kawashima et al. | 455/435.2 |
| 2006/0080659 A1 | 4/2006 | Ganji | 717/178 |
| 2006/0172736 A1 | 8/2006 | Nevo | 455/435.1 |
| 2006/0203755 A1 | 9/2006 | Kim | 370/311 |
| 2007/0091861 A1 | 4/2007 | Gupta et al. | 370/338 |
| 2007/0150388 A1 | 6/2007 | Mendiratta et al. | 705/35 |
| 2007/0189241 A1 | 8/2007 | Zhang | 370/338 |
| 2007/0192158 A1 * | 8/2007 | Kim | 705/9 |
| 2008/0070495 A1 | 3/2008 | Stricklen et al. | 455/3.01 |

FOREIGN PATENT DOCUMENTS

| | | |
|---|---|---|
| EP | 1 526 682 | 4/2005 |
| EP | 1 589 781 | 10/2005 |
| WO | WO 02/03733 A1 | 1/2002 |
| WO | WO 2004/031488 | 4/2004 |
| WO | WO 2005/029901 | 3/2005 |

OTHER PUBLICATIONS

International Search Report dated Feb. 27, 2008 from Serial No. PCT/US2007/020593.
International Search Report dated Apr. 1, 2008 from Serial No. PCT/US2007/020596.

* cited by examiner

*Primary Examiner*—Vincent P Harper
*Assistant Examiner*—Natasha Cosme
(74) *Attorney, Agent, or Firm*—Williams, Morgan & Amerson, P.C.

(57) ABSTRACT

A method for scheduling tasks for execution by a mobile device is provided. A connectivity prerequisite is defined for a task scheduled to be executed by the mobile device. Connectivity state information associated with the mobile device is received. The connectivity prerequisite is compared to the connectivity state information. The task is executed responsive to the connectivity state information satisfying the connectivity prerequisite.

14 Claims, 11 Drawing Sheets

TASK SCHEDULER RESPONSIVE TO CONNECTIVITY PREREQUISITES

CROSS-REFERENCE TO RELATED APPLICATIONS

Not applicable.

BACKGROUND OF THE INVENTION

The present invention relates generally to communication systems and, more particularly, to a task scheduler responsive to connectivity prerequisites.

Network communication has evolved significantly in recent years to provide users with varied choices for accessing private networks, such as business or institutional networks, or public networks, such as the Internet. In general, each communication scheme involves a mobile device that connects with some sort of remote interface for accessing the larger network. For example, a user may employ a hard-wired or wireless communication scheme to establish a network connection. Exemplary hard-wired connection schemes include an Ethernet connection to a network router, hub, or switch, cable modem, digital subscriber line (DSL) modem, a dial-up modem connection, etc. Exemplary wireless connection schemes include a wireless local area network (WLAN) connection, a wireless wide area network (WWAN) connection, and a wireless personal area network (WPAN) connection. Further, these communication schemes may be mixed. For example, a user may connect through a WLAN or WPAN in a home environment to another device that that is in turn connected through a hard-wired connection, such as a cable modem, or a wireless connection to the Internet.

The wide variety of connection options provides the user with flexibility and the ability to connect to a network in virtually any location. In locations where the user can not establish an Ethernet connection or a WLAN connection, a WWAN (i.e., over a cellular network) may be established. However, this flexibility comes at a cost. The user must configure and manage each communication service. Separate account user IDs or passwords are typically required for each communication scheme. Also, the configuration is location specific. Different parameters may be specified depending on whether the connection is associated with a home, office, or public environment. Public environments may be trusted or untrusted.

A typical configuration wizard or install script implements a complex and time-consuming procedure that asks a user various questions regarding the connection. The user may not have all the answers to the questions at a given time. Moreover, because the configuration options may be location dependent, the user may not have access to the requested information or that facilities may not be available to test the connection settings. Due to these limitations, a user may have to execute the configuration procedure multiple times and in multiple locations, greatly increasing the required configuration time and adding to user confusion and dissatisfaction. Additionally, if one or more of the connections is not functioning properly, it is difficult for the user to identify the appropriate technical support contact. For instance, the technical support contact for the supplier of the mobile device may be unable to help the user diagnose and correct connection problems.

Typically, one or more of the communication schemes may be available to the mobile device at any given time. Rather than requiring a user to manually select a particular communication scheme, various tools have been developed to attempt to autonomously manage the scheme selection process. Such communication management tools typically employ various explicit rules or heuristics for making the connection choice. For example, the connection having the highest bandwidth or highest signal strength may be selected. In cases where a hard-wired connection, such as Ethernet is available, it may be selected by default.

Such connection rules may not always ensure that a connection is always available. For example, if the selected connection requires the collection of login or password information from the user, the establishment of the connection could be delayed.

Also, the bandwidth available for each scheme may vary as well as the cost of using each scheme. The bandwidth variations may impact the performance of applications executed by the user on the remote device. For example, some applications require large amounts of bandwidth to operate efficiently. If such an application is running during a period of time where a small bandwidth connection is active, the application performance may suffer and may also result in the degraded operation of other concurrent applications. In cases where the connection involves a usage-based fee schedule, operation of bandwidth intensive applications may significantly affect the user's service bill.

Some applications may be classified as background applications, which typically operate without direct interaction from the user. Background applications may be less impacted by increased latency. However, applications that require user interaction may be negatively impacted by data transfer delays. If a user is exchanging information with a remote party, additional delays may reduce the user's efficiency. Still other applications are highly intolerant of increased latency. For example, applications with transfer video or audio in real-time cannot tolerate latency. Missed packets may not be retransferred, and video or audio quality is irrecoverably lost. For example, in the case where a user is talking to a remote party using a voice-over-IP (VOIP) session, increased latency could prevent the parties from hearing each other or could result in the session being dropped.

Certain applications depend on connectivity of certain speeds to operate efficiently. However, since connectivity is managed automatically, the user does not know when to run such applications that depend on the connectivity. Also, automatic-timed scheduling is not practical, since the connectivity might not be available at the scheduled time. Conventional schedulers only block applications if the mobile device is operating on battery power.

Another issue related to using different connections is the power consumption associated with each connection type. While a particular connection may have a desirably high bandwidth, the connection modality may require significant processing power from the mobile device, thereby greatly shortening battery life. Also, an application requiring significant data transfer may consume considerable amounts of processing resources due to the load it places on the connection, also resulting in reduced battery life.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art. The present invention is directed to overcoming, or at least reducing the effects of, one or more of the problems set forth above.

BRIEF SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

One aspect of the present invention is seen in a method for scheduling tasks for execution by a mobile device. A connectivity prerequisite is defined for a task scheduled to be executed by the mobile device. Connectivity state information associated with the mobile device is received. The connectivity prerequisite is compared to the connectivity state information. The task is executed responsive to the connectivity state information satisfying the connectivity prerequisite.

Another aspect of the present invention is seen in a mobile device including a communication interface and a processor. The processor is coupled to the communication interface and operable to implement a scheduler. The scheduler is operable to define a connectivity prerequisite for a task scheduled to be executed by the processor, receive connectivity state information associated with the communication interface, compare the connectivity prerequisite to the connectivity state information, and direct the processor to execute the task responsive to the connectivity state information satisfying the connectivity prerequisite.

BRIEF DESCRIPTION OF THE SEVERAL VIEWS OF THE DRAWINGS

The invention will hereafter be described with reference to the accompanying drawings, wherein like reference numerals denote like elements, and.

Figure 1:
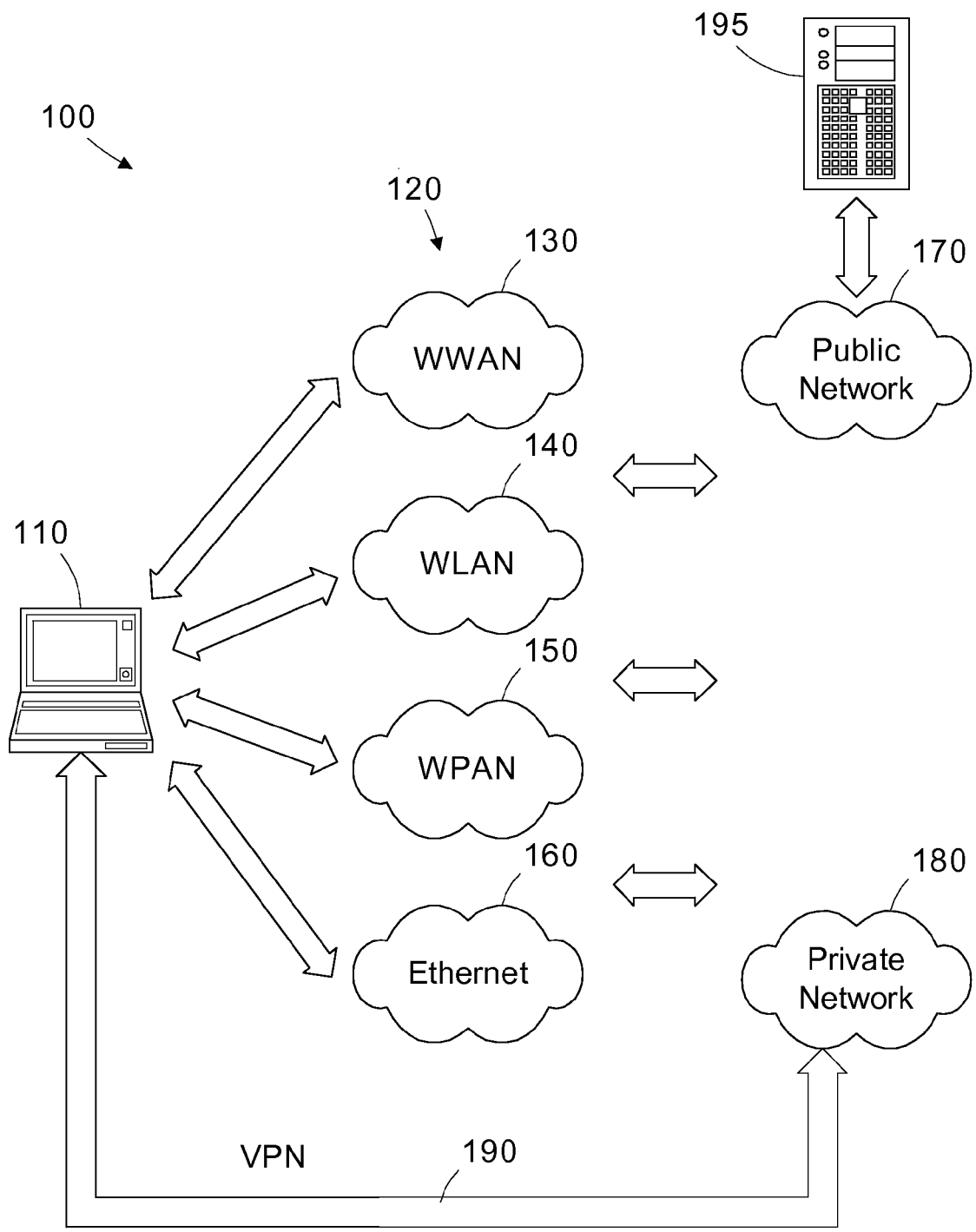
FIG. 1 is a simplified block diagram of a communication system in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to the drawings wherein like reference numbers correspond to similar components throughout the several views and, specifically, referring to FIG. 1, the present invention shall be described in the context of a communication system 100. The communication system 100 includes a mobile device 110 interfacing with a plurality of communication networks 120, such as a wireless wide area network (WWAN) 130 (e.g., Evolution-Data Optimized {EVDO}, High-Speed Downlink Packet Access {HSDPA}, other third generation {3G} cellular technologies, Global System for Mobile Communications {GSM}, Code Division Multiple Access {CDMA}, other second generation {2G} cellular technologies, Worldwide Interoperability for Microwave Access {WiMAX}, Wireless Broadband {WiBro}, etc.), a wireless local area network (WLAN) 140 (e.g., IEEE 802.11, Wi-Fi), a wireless personal area network (WPAN) 150 (e.g., Bluetooth®, IEEE 802.16a, Ultra-wideband {UWB}), an Ethernet network 160, etc. Each of the communication networks 120 may interface directly or indirectly with a public network 170 (e.g., the Internet) or a private network 180 (e.g., an institutional network).

Virtual connections 190, such as a virtual private network (VPN) connection may be established between the mobile device 110 and a remote party, such as the private network 180, for example. The virtual connection 190 may be established through one of the communication networks 120. For example, a user may establish a VPN connection to an employer network when working outside of an office environment.

A remote server 195 may be provided that is reachable by the mobile device 110 over the public network 170. As will be described in greater detail below, the mobile device 110 may access the remote server 195 to access various services related to configuring the mobile device 110 for interacting with the various networks 120, 170, 180.

Figure 2:
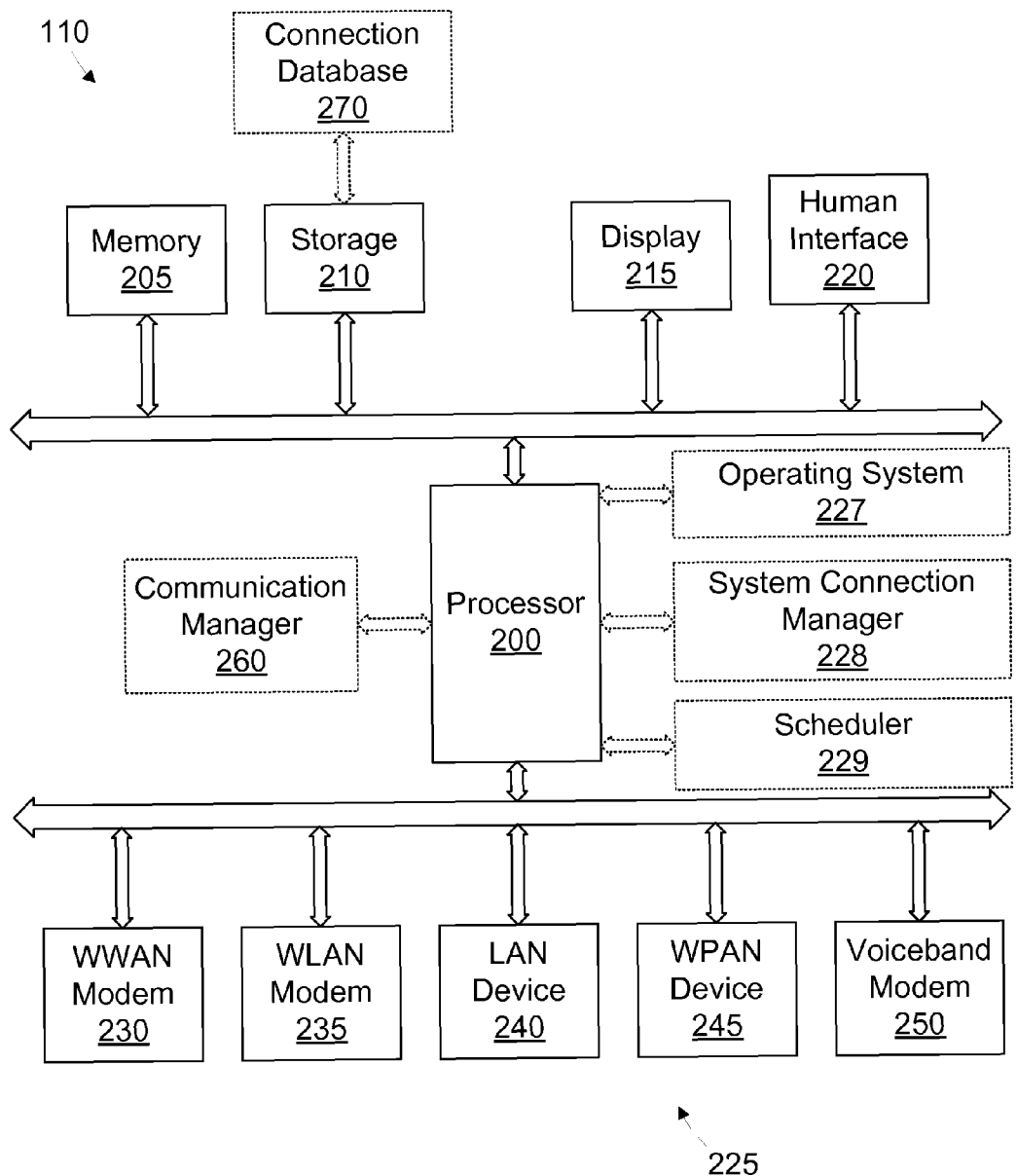
FIG. 2 is a simplified block diagram of a mobile device in the system of FIG. 1.

Turning briefly to FIG. 2, a block diagram of the mobile device 110 is provided. The mobile device 110 includes a processor 200, memory 205 (e.g., random access memory or flash memory), a storage device 210 (e.g., hard drive, flash memory, optical drive, etc.), a display 215 (e.g., monitor), a human interface 220 (e.g., keyboard, keypad, touchscreen, mouse, etc.), and a plurality of communication interfaces 225. The memory 205 and/or storage device 210 typically store various software applications for execution by the processor 200, such as user applications, an operating system 227, a system connection manager 228, a scheduler 229, device drivers, etc. The mobile device 110 may be implemented in a variety of hardware, including, but not limited to, a notebook computer, a desktop computer, a personal data assistant (PDA), a mobile telephone, etc. The term mobile device 110 does not necessary imply that the device is portable, but rather that it can be employed in a variety of environments. The particular connection and arrangements of elements in the mobile device 110 are not intended to imply any particular bus architecture, but rather just to illustrate the types of units typically found in a mobile device.

The number and type of communication interfaces 225 may vary depending on the particular implementation. Exemplary communication interfaces 225 that may be provided include a WWAN modem 230, a WLAN modem 235, a LAN device 240, a WPAN device 245, and a voice band modem 250 (e.g., V90). The various protocols required to implement connections over the communication interfaces 225 to the various communication networks 120, 170, 180 are known to those ordinary skill in the art, and are not described in greater detail herein for the sake of clarity and to avoid obscuring the instant invention.

The mobile device 110 implements a connection manager 260 (e.g., a software application) that manages the various communication interfaces 225 to determine which connections should be active at any given time. In general, the connection manager 260 evaluates availability, bandwidth, user preferences, application requirements, mobile device resources, etc. to select a particular communication interface 225. The connection manager 260 interfaces with the operating system 227 and/or device drivers to enable or disable various communication interfaces 225 to establish connectivity.

Referring now to Table 1, the connection manager 260 maintains data related to each of the communication interfaces 225. These parameters may be stored in a connection database 270 or other data structure for use by the connection manager 260. The particular uses for the various parameters are described in greater detail below. As illustrated in Table 1, the connection manager 260 may store data in the connection database 270 related to connection name, connection technology type, a location (LOC), a configuration flag (CFG), a bandwidth (BW), a connection time (CT), a user interaction required (UI) flag, a fast connect availability flag (FC), a power characteristics (PC), thermal characteristics (TC), a vendor name, a technical support contact (TSC) information, an ignore flag, and the like.

Certain data may be based on historical data collected by the connection manager 260, user specified parameters, or static parameters based on expected characteristics. For example, the connection times or bandwidth may be monitored and averaged by the connection manager 260 or the expected values may be specified during the configuration of the communication interface 225. Multiple entries for a given connection type may be present. For example, a first WLAN connection may represent a home wireless network, and a second WLAN connection may represent an office wireless network. The particular data associated with each communication interface 225 may vary, depending on the particular implementation. The application of the present invention is not limited to the particular parameters described in Table 1.

TABLE 1

Communication Interface Data

| Parameter Name | Exemplary Parameter Values |
| --- | --- |
| Connection Name | Various |
| Connection Type | WWAN; WLAN; WPAN; LAN; Voice Band; VPN |
| Location (LOC) | O—Office; H—Home; P—Public; PT—Public Trusted |
| Configured? (CFG) | Yes; No |
| Bandwidth (BW) | Various |
| Connection Time (CT) | Various |
| User Interaction Required for Login (UI) | Yes; No |
| Available for Fast Connect (FC) | Yes; No |
| Power Characteristics (PC) | Various |
| Thermal Characteristics (TC) | Various |
| Vendor | Various hardware or service vendor information |
| Technical Support Contact (TSC) | Various phone, email, or web contact information |
| Ignore Flag | Yes; No |

In general, the connection manager 260 provides functionality to simplify the user experience by automatically managing connectivity and configuration. Typically, the mobile device 110 may be used in various environments, such as home, office, or public (trusted or untrusted), each having separate configurations and communication networks 120 available. As will be described in greater detail below, the connection manager 260 may interface with the remote server 195 to access various data regarding the configuration of the communication interfaces 225 and the services available for connecting using the network services.

While the connection manager 260 seeks to always maintain an active connection using one or more of the communication interfaces 225, it also seeks not to overburden the user with a myriad of configuration options when first activated on the mobile device 110. To this end, the connection manager 260 implements a deferred configuration technique that avoids the conventional intensive installation wizard or script.

When the system is first initiated by a user, assume, for this example, that none of the communication interfaces 225 has been previously configured. The connection manager 260 polls the communication interfaces 225 to determine which, if any, might have connectivity. Based on the potential connections, the connection manager 260 selects one for initial configuration. For example, if the connection manager 260 determines that the LAN device 240 is coupled to an Ethernet network 160 it may select the LAN device 240 as the initial connectivity device.

The selection for the initial connection may be based on a variety of factors. In some embodiments, a default hierarchy of connection preferences may be used. For example, a default hierarchy may be LAN, WLAN, WWAN, WPAN. Alternatively, the user may be provided with a list of available connections from which to choose an initial connection preference. During the initial configuration, the connection manager 260 may ask the user configuration questions related to the selected initial connection. For example, a user ID and/or password may be required. The connection manager 260 may also ask the user the environment associated with the present location of the mobile device 110 (e.g., home, office, public trusted, or public untrusted). Generally, a trusted public network has selection priority over an untrusted public network. For example, an untrusted public network may not have security or identify checks.

After the initial configuration of the first connection, the connection manager 260 may close the configuration wizard and instruct the user that it is available to configure other communication interfaces 225 should the need arise (i.e., the configured connection is no longer available). Alternatively, the user may be provided with an option to view tutorial information or to configure one or more additional communication interfaces 225 prior to closing the configuration wizard.

During the initial configuration to establish connectivity, the connection manager 260 inhibits any applications that would require a connection. For example, many applications allow the use of on-line updating when they are first activated. Prior to the completion of the configuration wizard to establish initial connectivity, such update requests are not presented to the user. At a later point in time after the connection is established, these types of automated updates could be implemented. For example, the automatic updates may be allowed after a predetermined connection count, a login count, or after a predetermined time delay.

At some point later in time, the initial connection may no longer be available. For example, the location of the mobile device 110 may have changed from a home environment to an office or public environment. After identifying a loss of connectivity, the connection manager 260 once again initiates the configuration wizard to identify available connections and uses the default hierarchy to select a particular communication interface 225 to configure. During this subsequent setup, the connection manager 260 may ask the user for a location (e.g., home, office, public trusted, or public untrusted) and complete the configuration in a similar manner as described above for the initial connection. Again, after connectivity is reestablished, the user may be provided with tutorial screens, an exit screen, or an option to configure additional connections.

Deferring the configuration of the multiple communication interfaces 225 simplifies the user experience. Only when connectivity is not available is the user required to complete configuration of additional communication interfaces 225. Thus, the user is provided with initial connectivity with reduced complexity while the connection manager 260 learns the user's connection patterns.

During the configuration period, or during any subsequent usage period for that matter, the connection manager 260 monitors the user's connection behaviors to identify patterns and attempt to automate such configuration changes. The connection manager 260 may interface with the operating system 227 continuously or periodically to identify such connection patterns. For example, the connection manager 260 may identify that when using a particular communication interface 225, a particular printer is selected or a browser proxy setup is changed. Upon identifying such a connection pattern, the connection manager 260 queries the user to determine if the selection should be made automatically responsive to the particular communication interface 225 and connection being used.

Another connection pattern that may be monitored by the connection manager 260 is VPN usage. The connection manager 260 may monitor activations of the VPN client software and prompt the user to determine if a VPN session should be established automatically when the particular communication interface 225 is used in the same location. For example, if the user activates a VPN connection after connecting to a home network, the connection manager 260 can prompt the user to ask if the VPN connection should be activated automatically upon connection to the home network.

Figure 3:
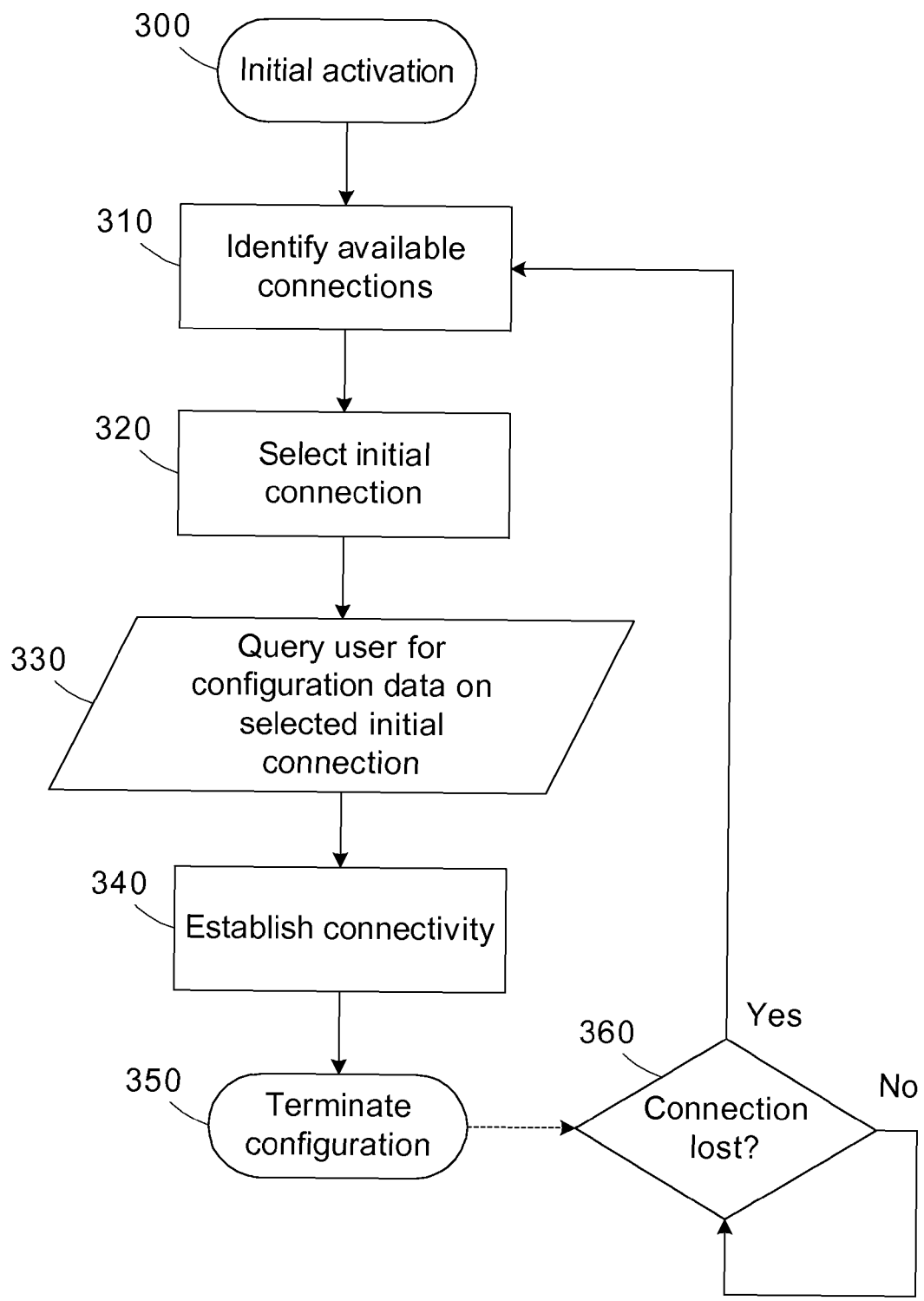
FIG. 3 is a simplified flow diagram of a method for configuring the mobile device.

The deferred configuration technique implemented by the connection manager 260 is described with reference to FIG. 3. In method block 300, the method starts upon initial activation of the connection manager 260 (e.g., when the user first purchases and activates the mobile device 110). In method block 310, the connection manager 260 identifies available connections. An initial connection is selected in method block 320. The initial selection may be based on a predetermined hierarchy or based on input from the user, for example. The user is queried for configuration data for the selected initial connection in method block 330. Exemplary configuration data includes user ID, password, environment (e.g., home, office, public trusted, public untrusted), etc. In method block 340, the connection manager 260 established connectivity, and terminates the configuration in method block 350. At a subsequent point in time, the connection manager 260 identifies a loss of connectivity in method block 360 and reinitiates the configuration wizard at method block 310.

Another technique that may be employed by the connection manager 260 to simplify the user experience is to defer questioning the user about the location of a connection each time it is first employed. Typically, the heuristics used for connection selection depend, at least in part, in the level of trust associated with the connection. For example, office networks may have a high level of trust, while public networks would be associated with a relatively low level of trust, unless they are specifically designated as trusted public networks.

During use, the mobile device 110 may be employed in many different public environments where wireless networks 130, 140, 150 are detectible, such as a coffee shop, a library, a home airport, various destination airports, nearby homes or businesses, etc. Certain networks are "visible" in that they broadcast their identities using beacon signals, while other networks that do not broadcast their identities are "invisible." To connect to an invisible network a connection attempt must be made. If the connection attempt fails, the network is deemed to be unreachable. Hence, when determining the available connections at any given time, the connection manager 260 may have to attempt connect to each invisible network to determine its availability. Failed connections to invisible networks are time-consuming and may increase the time required to establish connectivity for the mobile device 110.

To determine candidates for establishing a connection, the connection manager 260 stores records in the connection database 270 for previously encountered networks. This information links locations with networks used and networks not used in a particular location. Rather than burdening the user with configuration questions for each network encountered, the connection manager 260 defers the query until a particular network configuration has been identified two or more times. For example, if the same array of networks is identified, it is likely that the user frequents the location. Subsequently, the user may be requested to designate the location with the recognized network configurations. For example, the user may specify a general location category of public, with a more detailed subcategory designation of university or home airport for the location. Subsequent to the location designation, the connection manager 260 may track the user's preferences in the particular location.

In some embodiments, the mobile device 110 may have global positioning system (GPS) location tracking ability. If this is the case, the mobile device 110 may automatically designate the physical location for preference tracking in addition to or in place of querying the user to designate the location. By waiting until identifying the particular network configuration more than once, the user is not burdened with constant configuration queries each time a particular network is encountered. Other positioning information may be gathered from the communication networks. For example, location may be learned by querying a Wi-Fi network to determine the signal power and location of the access point. Location information may also be provided by the network operator (e.g., phone company or cellular network operator).

After designating a known location, the connection manager 260 tracks networks available in the designated location as well as the user's connection patterns in that location. For example, unused networks may be labeled as networks to ignore by setting the ignore flag. Ignoring unused networks helps declutter information presented to the user by displaying only the relevant networks rather than all of the networks in a given location.

The connection manager 260 may employ location information to determine which invisible networks may be available in a particular location rather than employing the time consuming connection attempt scheme. The visible networks can help the connection manager 260 rapidly determine the wireless configuration at the location. The visible networks provide an indication regarding which invisible networks might be available due to the tracked network configuration and usage patterns. Consider the case where the connection manager 260 is attempting to establish connectivity in a particular location. If the visible networks that the connection manager 260 has seen in the past when connected to the invisible networks are not present, then the connection manager 260 can appropriately prioritize and defer attempting to connect to an invisible network until after it first establishes an initial connection using some other means (or until it has exhausted other possibilities that are faster).

Note that dropped connections also provide good clues regarding location. For example, consider an initial case where the mobile device 110 is using an office LAN connection. The connection is dropped when the user undocks the mobile device 110. Based on previous usage information tracked for the office location, the connection manager 260 is aware that an invisible WLAN network 140 has been previously available when the office LAN is present. Based on this knowledge, the connection manager 260 can prioritize the establishing of a connection with the invisible WLAN. On the other hand, if the office LAN was last used but the mobile device 110 goes through a sleep cycle and resumes again, the connection manager 260 does not assume that the invisible WLAN 140 is present since the physical location may have changed. The connection manager 260 can, however, use other visible WLANs 140 to attempt to determine the location. Other network devices may also be used to determine location. For example, the visible carrier(s) for 3G networks, the visible Bluetooth® devices (e.g., fixed location printers or automobiles) provide location identifiers.

By keeping records of the networks normally seen and normally used in a particular location, the connection manager 260 can note changes in networks. For example, if a new network appears in a previously recognized location, the user may be prompted to determine if the user would like to use the new network or to ignore the new network.

Some individual networks may be associated with multiple locations. For example many WLAN networks 140 have the same identification information across many locations for ease of use. Many service providers and corporations employ a common identification scheme across multiple network locations. Thus, a particular network may be encountered in many actual locations, but the connection manager 260 waits to prompt the user for location when the nearby signatures look the same more than once (i.e., or some other threshold number designated by user preference).

Figure 4:
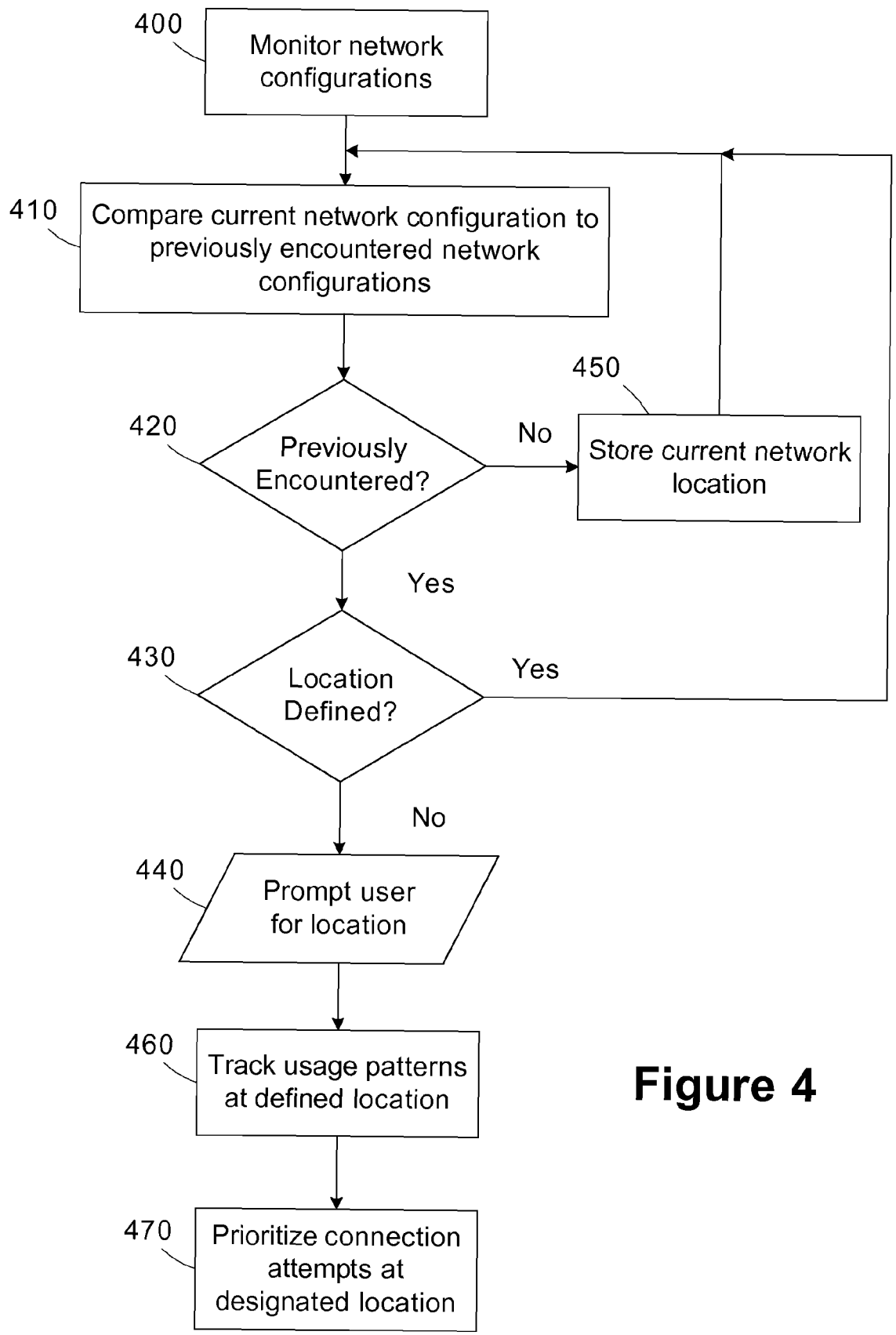
FIG. 4 is a simplified flow diagram of a method for identifying a location of the mobile device.

The location learning technique implemented by the connection manager 260 is described with reference to FIG. 4. In method block 400, the connection manager 260 monitors network configurations. In method block 410, the connection manager 260 compares a current network configuration to previously encountered network configurations and determines if the current network configuration has been previously encountered in method block 420.

If the current network configuration has been previously encountered in method block 420, the connection manager 260 determines if location information has been defined in method block 430. If the location has not been defined, the connection manager 260 prompts the user to designate a location in method block 440. If the current network configuration has not been previously encountered in method block 420, the connection manager 260 stores the current network configuration in method block 450 and returns to method block 400 to monitor the network configurations until the particular configuration is identified a second time. Of course, as indicated above, identification threshold may be set at a number greater than two.

After the location is defined in method block 440, the connection manager 260 tracks usage at the defined location in method block 460. These usage patterns may be employed to prioritize connection attempts at the designated location in method block 470, as described above.

During normal operation of the mobile device 110, the connection manager 260 employs the information it has gathered in the connection database 270 to attempt to provide always-on connectivity for the user. Hence, when the connection manager 260 identifies that no current connection exists it tries to rapidly establish connectivity so that the user's activities are not delayed. At times of no connection, it is not necessarily the primary goal of the connection manager 260 that the "best" network be selected, but rather that connectivity be established a soon as possible. After initial connectivity is established, the connection manager 260 can seek to identify the best connection available (e.g., based on performance heuristics such as cost, bandwidth, signal strength, etc.). The connection manager 260 employs information stored in the connection database 270 regarding connection times (i.e., connection time field and/or user interaction required flag in Table 1) for each available connection as well as user preferences (i.e., fast connect availability flag in Table 1) to determine the order in which connections should be tried to establish connectivity.

Typically, the fast connect process is employed in situations where there is no connection, and a connection is required or desired. For example, when a device is first powered on a connection may be required during the power-up sequence for various functional housekeeping purposes. The fast connect is helpful in speeding up the connection acquisition, and thus the completion of the start-up sequence. Another situation where fast connect is useful is upon resuming operation from some type of limited functional mode. For example, if the mobile device 110 is a notebook computer, it enters a hibernation mode when the lid is closed. A fast reconnect allows functionality to be restored quickly after the lid is again opened. Yet another situation where a fast connect is useful is upon exiting an airplane or other location that bans the use of RF networks. For example, a hardware switch may be activated to disable RF devices. When the switch is enabled upon exiting the restricted area, the connection manager 260 may implement the fast connect procedure.

In general, the connection manager 260 stores information regarding the connection times of the various tracked communication interfaces 225 and the communication networks 120. This information may be a predetermined set of expected connection times, or alternatively, the connection manager 260 may track actual connection times to determine an expected connection time (e.g., using an average or weighted average function). These tracked connection times may be stored as values in seconds or as relative metrics (e.g., very fast, fast, medium fast, slow). In cases, where the connection priorities are hard-coded, the connection times may be stored as relative metrics indicating the order in which communication interfaces 225 should be selected to establish connectivity. For example, a LAN connection is very fast typically, but may be slow if there is a very long latency path to some of the network services. A 3G WWAN network 130 is typically very fast, while a Wi-Fi WLAN network 140 is typically much slower.

The connection manager 260 may also use a combination of actual connection times and relative metrics. For example, if the number of connections made through a particular communication interface 225 is low a reliable connection time may not be available. However, that particular communication interface 225 may be of the type that typically connects quickly. Hence, the connection manager 260 may set the connection time to a relative value of fast until such a time that a reliable connection time may be established and recorded. Accordingly, for a subset of the connection for which fast connect is allowed, some may have associated connection times in seconds, while others may have relative metrics. In establishing a hierarchy, the connection manager 260 may rank those communication interfaces 225 with fast connection times based on actual monitored connection times above those with fast relative metric values. In this manner, the communication interfaces 225 may be arranged in order of descending connection time. For instance, the following order may be used—fast actual; fast metric; medium actual; medium metric; slow actual; slow metric. In cases where actual connection times are monitored, the thresholds for fast, medium, and slow are implementation specific, and may vary. For example, a fast connection time may be less than 2 seconds, a medium connection time maybe 10 seconds, and a slow connection may take longer than 30 seconds In the case where a particular connection requires user interaction for login (i.e., UI=Yes) it is not preferred by the 260 for establishing a fast connection. For example, user interaction might be required to navigate a logon (e.g., a Wi-Fi logon screen for a paid Wi-Fi service) or a VPN screen (to provide a user ID and/or a password).

In addition, a user may be able to set preferences for fast connect, including disabling the function entirely or selecting particular networks that may or may not be used (e.g., setting the FC flag). For example, a user may not want to use a 3G network for fast connection because the use may incur added costs per connection. However, if the user has an unlimited usage plan, the user might want to always prefer 3G for the fast connect function. Thus, a user with a usage limited account may deassert the FC flag, while a user with unlimited access may assert the FC flag for the WWAN network 130. The connection manager 260 incorporates these preferences in its fast connect prioritization. Generally, the connection manager 260 attempts to establish connectivity to the fastest eligible connection based on the connection time data and the user's preferences. In the case where fast reconnect is disabled, the "best" connection default heuristics are used for selecting a connection.

In some cases, the connection manager 260 may autonomously disable the fast connect mode when it senses that there are no software applications running that require connectivity. Of course, as soon as such an application is launched, the connection manager 260 may re-enable fast connect. In this manner, connectivity is provided to the newly launched application as soon as possible. An improved connection may be subsequently provided after the initial fast connect once the connection manager 260 evaluates all options and determines the best choice.

Figure 5:
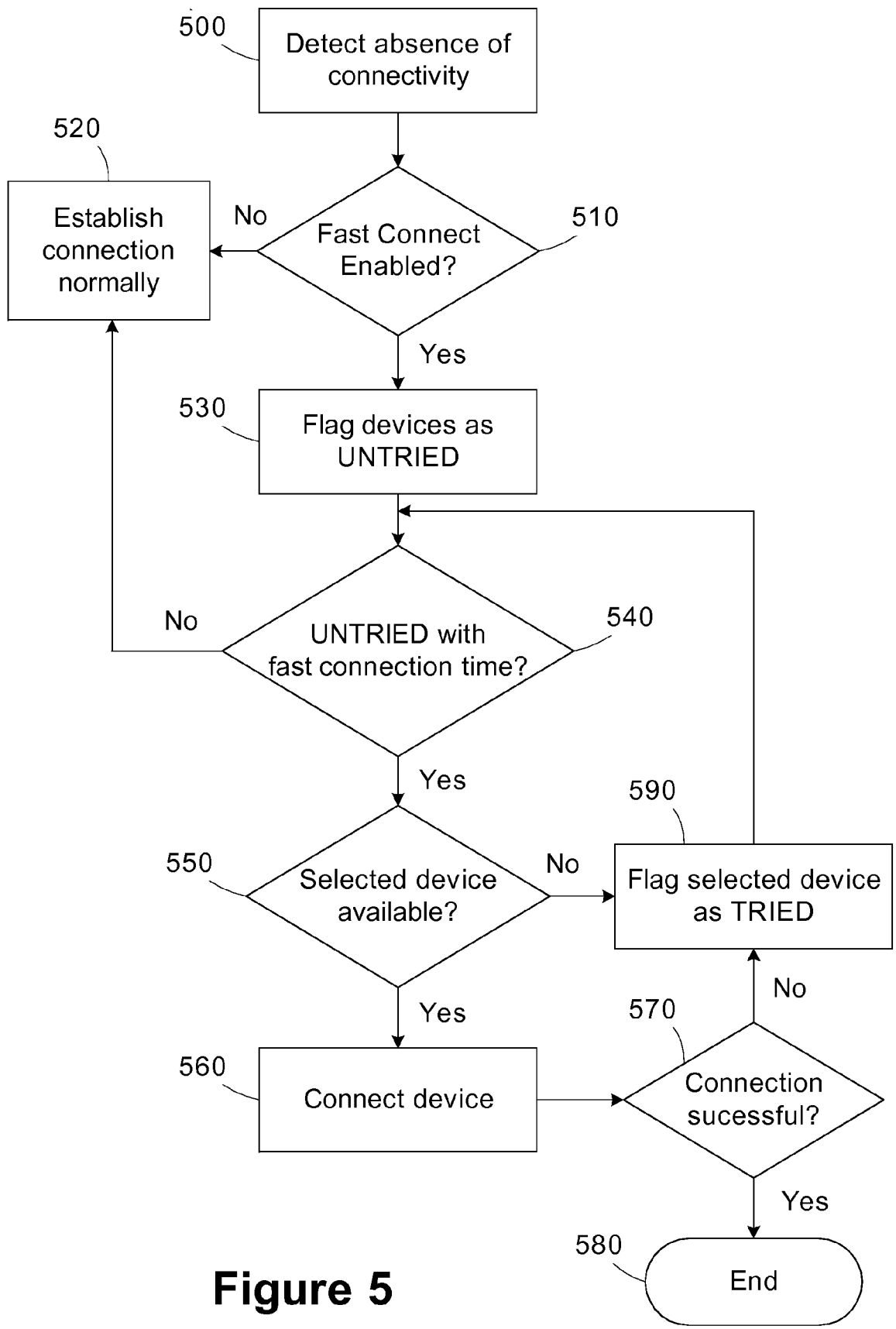
FIG. 5 is a simplified flow diagram of a method for implementing a fast connect process.

FIG. 5 illustrates a simplified flow diagram of a method that may be employed by the connection manager 260 to implement a fast connect. In method block 500, the connection manager 260 detects the absence of connectivity. If fast connect is not enabled in method block 510 (i.e., by user preference or by the connection manager 260 based on application requirements), the connection manager 260 established connectivity using normal "best" connection techniques in method block 520.

If fast connect is enabled in method block 510, the connection manager 260 flags all the devices (e.g., communication interfaces 225) as UNTRIED in method block 530. In method block 540, the connection manager 260 determines if there is a device with a fast connection time present in the group of untried devices (i.e., as determined by a threshold value or relative metric).

If no untried devices have fast connect times in method block 540, the connection manager 260 proceeds with establishing connectivity normally in method block 520. If an untried fast connect device is present, the connection manager 260 determines the availability of the selected device in method block 550 and attempts to connect using the selected device in method block 560. Note that for a given communication interfaces 225, multiple connection possibilities may exist depending on the particular location of the mobile device 110. Hence, the connection manager 260 may attempt multiple times to establish a connection using a particular communication interface 225 in method block 560. If location information has been previously tracked, as described above in reference to FIG. 4, the connection manager 260 may attempt to connect to both visible and invisible networks depending on the particular expected environment.

If the connection is successful in method block 570, the fast connect method terminates in method block 580. If the selected device is not available in method block 550, or the connection attempt fails in method block 570, the connection manager 260 flags the selected device as TRIED in method block 590 and returns to method block 540 to identify another fast connect candidate.

During operation of the mobile device 110, the connection manager 260 monitors the communication load being handled by the selected communication interfaces 22 and compares the monitored load to the bandwidth associated with the connection (e.g., based on historical performance or pre-set values) to determine periods of high load. High load may result from one or more applications facilitating significant data transfers using the selected connection. If the system load approaches the bandwidth limit for an extended period, performance of the mobile device 110 and the running applications may degrade. For example, if the connection is being used nearly to capacity and an additional application is executed that requires still more bandwidth, the connection may not be able to support the total load. As a result, the running applications may experience increased latency for data transfers. Depending on the nature of the application and its intended use, these additional delays may negatively impact the user's ability to operate efficiently.

By monitoring the load on an active connection, the connection manager 260 tries to proactively prevent increased latency from an overloaded connection from impacting the performance of the running applications or the efficiency of the user. In general, the connection manager 260 interfaces with the operating system 227 or other applications to schedule various events to effectively use the available bandwidth without negatively impacting performance. The user may set preferences for communication load monitoring, including disabling the monitoring function and/or specifying the connections available for communication load adjustment.

When the monitored load exceeds a predetermined threshold (e.g., 85% of capacity), the connection manager 260 may take one of several actions to manage the load. In the illustrated embodiment, the connection manager 260 monitors and reacts to average load, however, it is contemplated that peak or instantaneous load values may also be taken into consideration.

In some cases, a particular communication interface 225 may not actually be able to support its rated capacity due to practical signal considerations. Hence, the connection manager 260 may use other information to determine if the capacity limit of the channel is met. A first technique is to monitor the queue for the channel by interfacing with the operating system 227. If the queue always has data waiting to be transferred, it is reasonable to conclude that the channel is at capacity. Another technique is to evaluate the signal to noise ratio (SNR) of the channel. Given knowledge of the SNR and the technology, the capacity may be estimated. The capacity may also be estimated based on the signal strength alone, depending on the particular technology and device. Yet another technique is to employ historical knowledge regarding the transfer speed peaks of the particular network. The capacity of the network itself may be the bandwidth limiting factor. For example, if the peak historical bandwidth at a particular site has never exceeded 1 Mbps at some public location, it can be reasonably inferred that the network is the limiting case, even though a very high signal strength is present. In such a case, if the current usage is close to the observed historical peak, the channel is effectively at capacity.

A first action that may be taken by the connection manager 260 in response to a monitored load exceeding a capacity threshold is to attempt to establish a connection with a higher bandwidth. Based on the bandwidth data stored in the connection database 270 and knowledge of the location of the mobile device 110, the connection manager 260 may attempt connecting to a visible or invisible network 120 having higher capacity. Besides bandwidth considerations, the connection manager 260 may also evaluate other quality of service (QoS) attributes of the available connections before establishing a new connection. For example, latency or error handling characteristics or the network 120 may also be considered.

If the connection manager 260 can identify a more appropriate connection (e.g., by enabling the LAN device 240), the connection manager 260 switches to the larger pipeline by enabling the proper communication interface 225 and changing the appropriate operating system 227 configurations to make use of the new communication interface 225. In some cases, the previous communication channel is dropped and its associated communication interface 225 is disabled. The resulting larger pipeline increases the responsiveness of the mobile device 110 to user requests, helps applications complete their data transfer activities sooner, or reduces the mobile device 110 power consumption.

If no better connection is available at a particular time, the connection manager 260 communicates with the user (e.g., using a pop-up dialog box or other communication) to determine if the user can take any steps to make a better connection available. For example, the connection manager 260 may request that the user plug in a cable to the LAN device 240.

If the interaction with the user is not successful in making a better communication link available, the connection manager 260 queries the user to determine if certain bandwidth activities should be aborted to preserve bandwidth for other applications. For example, the user may request that a background application (e.g., synchronizing files or emails) be aborted. The connection manager 260 reschedules the aborted activity at a later time, presumably when the bandwidth load will be decreased or a better connection will be available. If the aborted application cannot be rescheduled automatically by the connection manager 260 (i.e., by interacting with the scheduler 229), the connection manager 260 will schedule a user reminder (e.g., pop-up) to prompt the user to re-execute the aborted application. When the user directs the connection manager 260 to abort an application, the user may specify the time period for the re-execution or the reminder (e.g., 1 hour, 12 hours, one day, etc.). Prior to the automatic reminder or re-execution, the connection manager 260 may monitor the available connections and mobile device state and prompt the user when there is sufficient bandwidth, battery, and communication capability to complete the activity.

In determining the availability of mobile device 110 resources, the connection manager 260 may estimate or request (e.g., during the abort query) the total amount of data to be transferred. The connection manager 260 stores in the connection database 270 an estimate for each communication interface 225 and associated communication channel of the energy required to communicate using the particular connection. The energy consumption requirements may be estimated for each communication channel based on the interface type.

Another situation where load monitoring is useful is when a communication link is being heavily utilized, and that link requires payment, either by units of time or data transfer. In cases where the load is expected to result in appreciable network costs, the connection manager 260 may determine if a free, but possibly slower, network is available and prompt the user to determine if the connection should be switched to reduce cost. Alternately, the connection manager 260 may suggest that the data transfer be postponed to a time when a cheaper or free network is available.

Figure 6A:
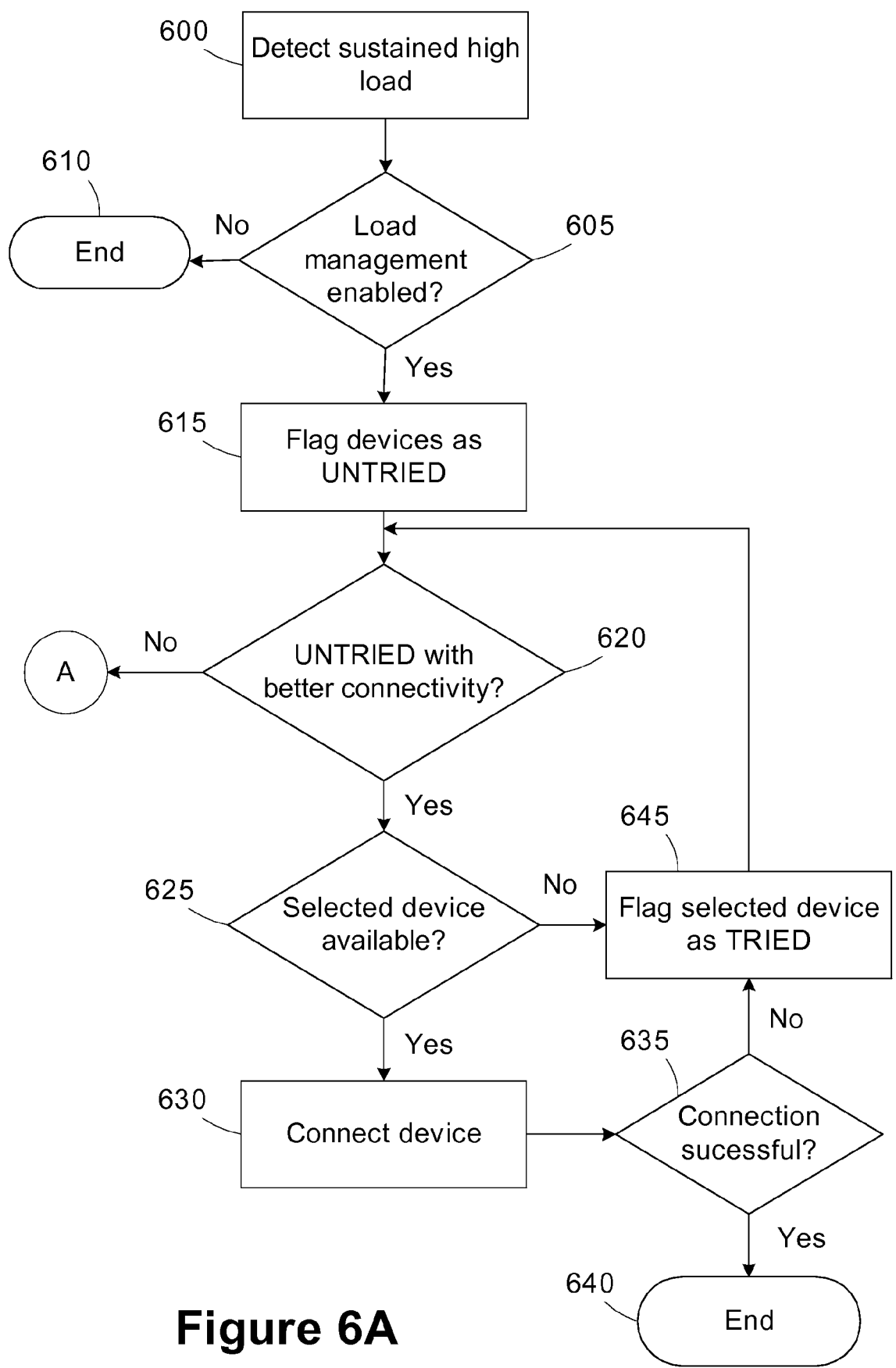
FIGS. 6A and 6B provide a simplified flow diagram of a method for managing communication load.
Figure 6B:
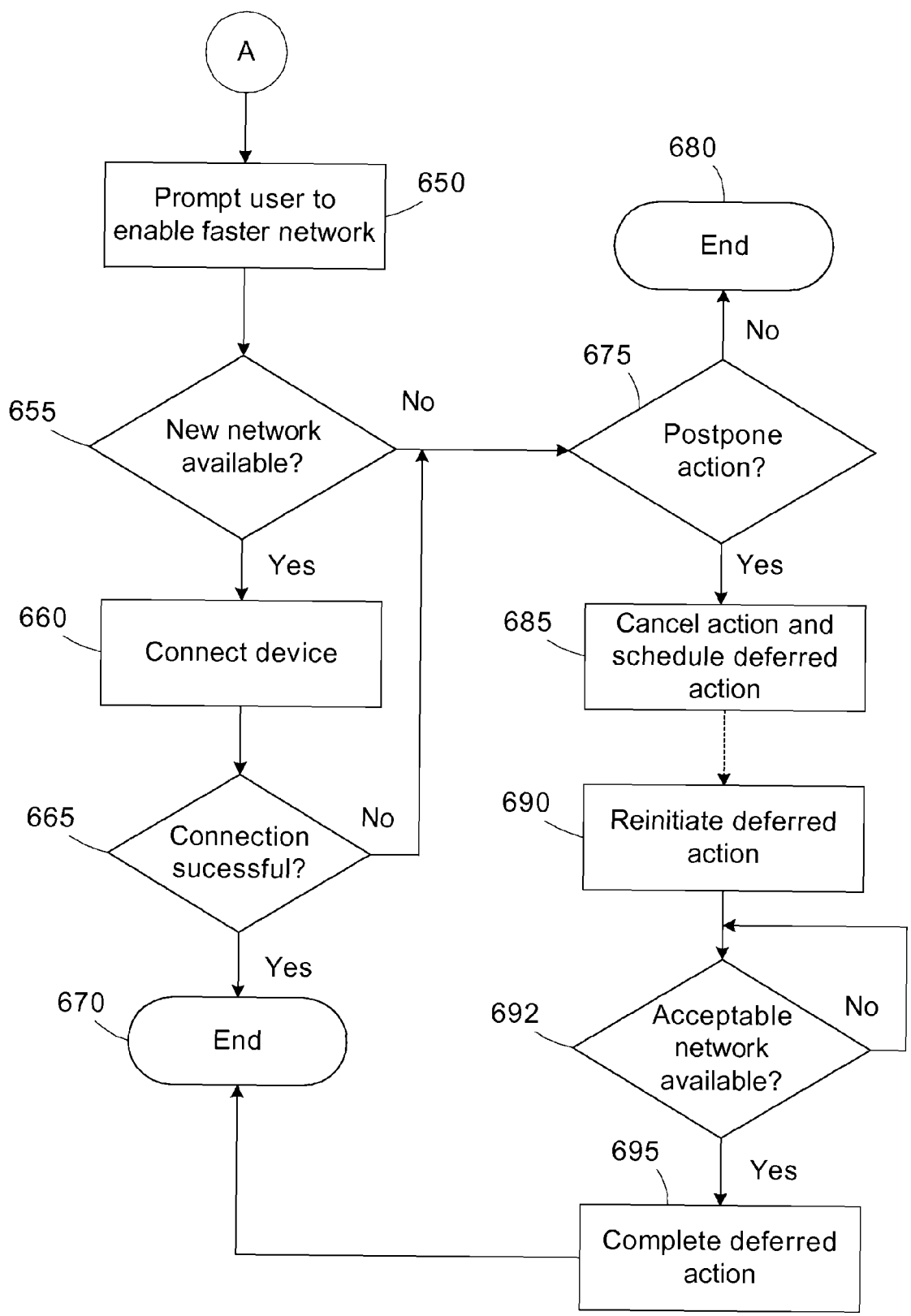

Turning now to FIGS. 6A and 6B, a simplified flow diagram of a method for responding to communication load is provided. In method block 600 (see FIG. 6A), the connection manager 260 detects a sustained high load on the current communication link over the active communication interface 225. If load management is not enabled in method block 605 (i.e., by user preference), the method terminates at method block 610. If load management is enabled, the connection manager 260 flags all the devices (e.g., communication interfaces 225) as UNTRIED in method block 615. In method block 620, the connection manager 260 determines if there is a device with better connectivity present in the group of untried devices (i.e., as determined by speed, latency, QoS). If an untried device with potentially better connectivity is identified in method block 620, the connection manager 260 determines the availability of the selected device in method block 625 and attempts to connect using the selected device in method block 630. Note that for a given communication interfaces 225, multiple connection possibilities may exist depending on the particular location of the mobile device 110. Hence, the connection manager 260 may attempt multiple times to establish a connection using a particular communication interface 225 in method block 630. If location information has been previously tracked, as described above in reference to FIG. 4, the connection manager 260 may attempt to connect to both visible and invisible networks depending on the particular expected environment. If the connection is successful in method block 630, the fast connect method terminates in method block 640. If the selected device is not available in method block 625, or the connection attempt fails in method block 635, the connection manager 260 flags the selected device as TRIED in method block 645 and returns to method block 620 to identify another fast connect candidate.

If no untried devices with better connectivity are present in method block 620, the connection manager 260 prompts the user to enable a better network in method block 650 (see FIG. 6B). If a new network becomes available in method block 655, the connection manager 260 attempts to connect through the associated communication interface 225 in method block 660. If the connection is successful in method block 665, the method terminates in method block 670.

If a new connection cannot be made available in method block 655 or the connection attempt fails in method block 665, the connection manager 260 determines if one or more actions that are consuming bandwidth should be postponed in method block 675. For certain background tasks, the connection manager 260 may postpone the actions automatically. For other tasks, the connection manager 260 queries the user to determine if the action(s) should be postponed. If no actions can be postponed or the user elects not to postpone in method block 675, the method terminates in method block 680.

If the action can be postponed in method block 675, the connection manager 260 cancels the action and schedules a deferred action in method block 685. There are multiple ways that the connection manager 260 can cancel the action and/or schedule the deferred action. In some cases, the connection manager 260 may be able to interface with the operating system 227 to cancel the action, while in other cases, the user may have to manually cancel the action. The connection manager 260 may ask the user to provide a name for the deferred action or the name may be retrieved through an interaction with the operating system 227, which the user may be asked to confirm. Note that it may be possible in some embodiments to interact with the operating system 227 to estimate the total amount of data transfer required to complete the action. In other cases, the user may be prompted to provide an estimate of the percentage completion. The total data remaining may be computed using the load monitoring information calculated previously in combination with the percentage complete.

The deferred action is reinitiated by the connection manager 260 in method block 690 at some later point in time. In some embodiments, the connection manager 260 may reinitiate the action on its own by interfacing with the scheduler 229. In other embodiments, the connection manager 260 prompts the user to reinitiate the action. In method block 692, the voice band modem 250 determines if an acceptable network is available for completing the deferred action. This determination may entail determining if sufficient batter power is present to complete the transaction. The deferred action is completed in method block 695 (i.e., automatically or based on a user prompt), and the method terminates in method block 670. The connection manager 260 may verify completion of the deferred action automatically or the user may be prompted to verify that the action has been completed. After verifying the completion, the connection manager 260 removed the deferred action from its schedule.

The communication load monitoring and deferred action functions of the connection manager 260 are useful in many situations. In one example, the user is surfing a web site and selects a file for download. The file it larger than the user anticipated and is taking a long time to transfer. The user is in a public place and the lengthy transfer is conducted using the WWAN modem 230 (e.g., a 3G channel), which consumes significant battery power. The connection manager 260 identifies the load on the WWAN modem 230 and asks the user to find a better connection. A better connection is not available in the public setting, so the user opts to be reminded to download the web file later. When the user returns home, connects the mobile device 110 to a power source, and the communication manager 260 connects using the WLAN modem 235 (e.g., a Wi-Fi connection), the connection manager 260 reminds the user to download the file. The connection manager 260 may provide the address for the file and even open the browser, or the user may manually open the browser and use the browser history data to find the link to the file.

In another example, a scheduled synchronization starts while the user is traveling. The synchronization updates the user's latest audio, video, and photo files. Typically, the synchronization is performed every morning in the office on the LAN. However, the user is traveling while connecting using the WLAN modem 235 and does not want the transfer consume battery power. The connection manager 260 notices the load from the synchronization operation and asks the user if it should be deferred (i.e., no better connection is available). Later, when the user arrives at a hotel and connects to a LAN in the room, the connection manager 260 prompts the user with a reminder and the synchronization is allowed to complete.

While, the load monitoring function of the connection manager 260 described in reference to FIGS. 6A and 6B does attempt to conserve battery power, it does so only under times of high load. There are other instances where the connection manager 260 may change the configuration of the communication functions in direct response to the power state of the mobile device 110. The power state includes whether the mobile device 110 is connected to an external power supply, the level of charge remaining, if operating on battery power, and the remaining time to fully charge the battery. The thermal condition of the mobile device 110 is also a subset of the power state. The thermal condition indicates if the mobile device 110 is overheating.

During use, the mobile device 110 may be placed into a particular system configuration to emphasize particular performance characteristics. For example, the system connection manager 228 may define various modes that emphasize characteristics such as performance of the processor 200, game performance, battery life, or quietness (i.e., no fans). The operating system 227 also includes a function that monitors and predicts battery life (e.g., that is time until depletion).

The operating system 227 reports time remaining and also provides a number of battery alarm notices, typically set by a specific amount of time or specific percentage of total capacity remaining. In some embodiments, there may be two alarms, an early warning (e.g., 25% battery remaining) and a final warning (e.g., 2% battery remaining). After the final warning, the mobile device 110 typically shuts down or suspends. The operating system 227 also typically provides an indication of whether AC power is currently available and the time remaining until full change.

The connection manager 260 stores in the connection database 270 the power and thermal characteristics of the various communication interfaces 225 and connections available. The connection manager 260 also interfaces with the operating system 227 to identify the current operating mode and power state. The connection manager 260 monitors the power state (i.e., based on status and alarm information from the operating system 227) and includes the power state information in its evaluation of the appropriate communication interface 225 to use.

If the system configuration mode indicates that no communication link is desired, the connection manager 260 disables all the communication interfaces 225 and the fast connect function. If the system configuration mode indicates that a rich connection is desired, the connection manager 260 operates in its normal mode and attempts to choose the "best" connection given all the information at its disposal. If the system configuration mode indicates that limited connectivity is desired, then the connection manager 260 may choose a low power, low thermal communication link or connect intermittently to a network using a higher power communication link. The system connection manager 228 may provide information about how long to remain unconnected between connections. In cases where VPN or other authorization is needed (i.e., user interaction), the connection manager 260 will not choose an intermittent connection technique.

If the operating system 227 indicates that there is long battery life or that there is AC power available, the connection manager 260 operates normally. However, when an early battery alarm occurs, the connection manager 260 attempts to move to a lower power/lower thermal communication link. If none is available, the connection manager 260 prompts the user to determine if the communication link should be changed (e.g., disconnected or changed to intermittent).

In some cases, the battery alarm from the operating system 227 may cause the system connection manager 228 to change the operating mode to a battery conservation mode. In such a case, the connection manager 260 is informed of the change in power state not directly by the operating system 227, but indirectly based on the change in operating mode initiated by the operating system 227.

The actions of the connection manager 260 also apply to alarms associated with the thermal state of the mobile device 110. If an alarm indicates that the mobile device 110 is overheating, the connection manager 260 attempts to find a communication interface 225 with lower thermal characteristics through which to establish connectivity. Again, the indication of the thermal state may come directly from the operating system 227 based on the alarm or indirectly from the system connection manager 228 based on a change in operating mode.

The data stored in the connection database 270 regarding the power and thermal characteristics of the communication interfaces 225 may be based on default information associated with the technology type, may be device specific, or may be derived from actual accumulated measurements. The information may be entered manually, preinstalled, installed with the connection manager 260, or updated using on-line program updates. The information may be queried from the communication interfaces 225 themselves or from the operating system 227 power management or bus management interfaces.

Figure 7:
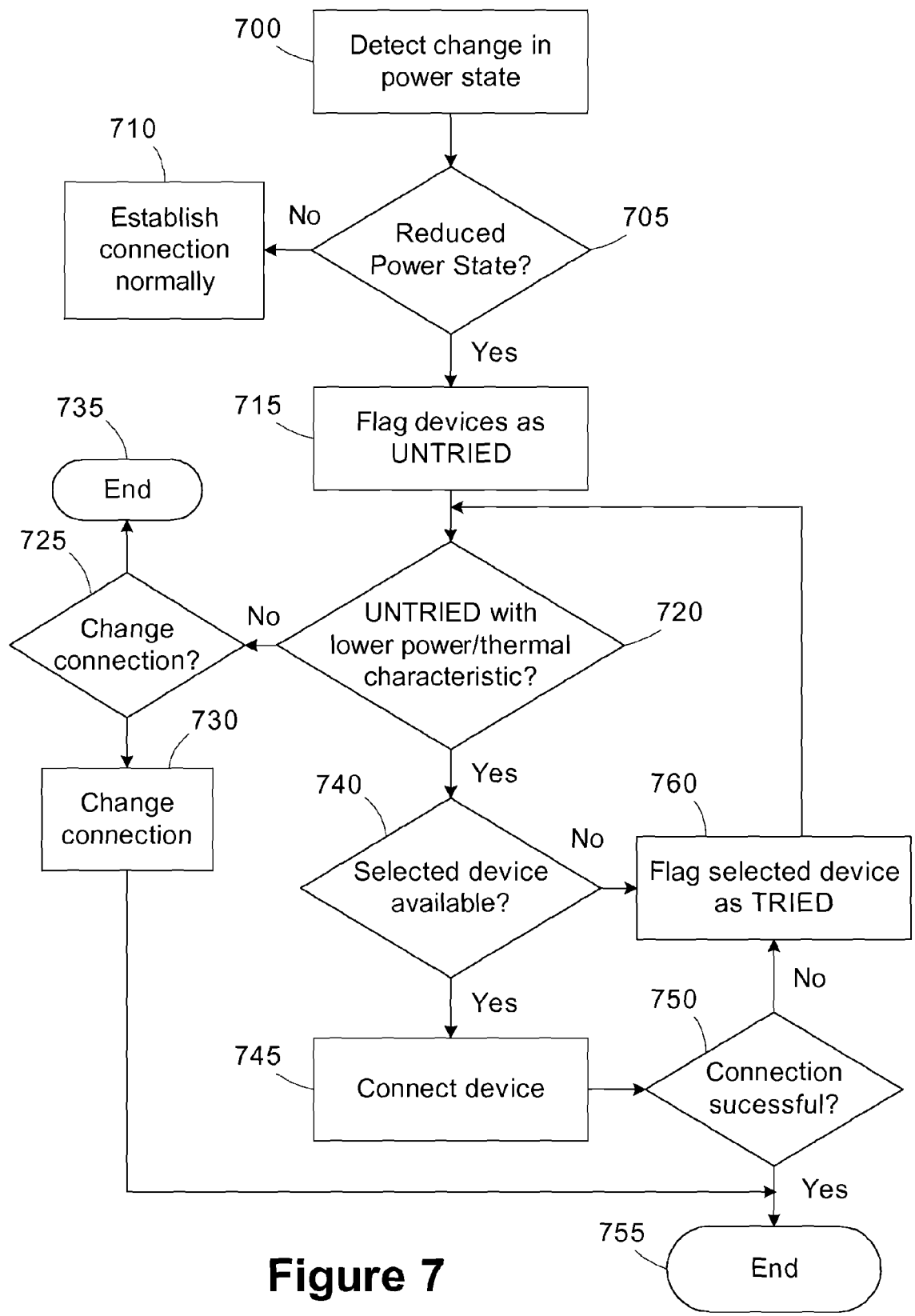
FIG. 7 is a simplified flow diagram of a method for responding to changes in power state.

FIG. 7 illustrates a simplified flow diagram of a method that may be employed by the connection manager 260 to react to the power state of the mobile device 110. In method block 700, the connection manager 260 detects a power state change (e.g., alarm or mode change). If the mode change is associated with an increased power state (e.g., connection to AC power or change to high performance mode) in method block 705, the connection manager 260 establishes the connection normally using the "best" connection technique in method block 710.

If the mode change detected in method block 700 is associated with a reduced power state (e.g., battery alarm or change to low power mode) in method block 705, the connection manager 260 flags all the devices (e.g., communication interfaces 225) as UNTRIED in method block 715. In method block 720, the connection manager 260 determines if there is a device with a lower power/thermal characteristic (i.e., power for a power alarm or thermal for a thermal alarm) present in the group of untried devices (i.e., as determined by a threshold value or relative metric). If no untried devices have lower power/thermal characteristics in method block 720, the connection manager 260 prompts the user to determine if the connection should be changed (e.g., disconnected or changed to intermittent) in method block 725. If the user elects to change the connection, the connection manager 260 implements the change in method block 730 or terminates the method in method block 735 if the user elects not to change the connection.

If an untried device is present in method block 720, the connection manager 260 determines the availability of the selected device in method block 740 and attempts to connect using the selected device in method block 745. Note that for a given communication interfaces 225, multiple connection possibilities may exist depending on the particular location of the mobile device 110. Hence, the connection manager 260 may attempt multiple times to establish a connection using a particular communication interface 225 in method block 740. If location information has been previously tracked, as described above in reference to FIG. 4, the connection manager 260 may attempt to connect to both visible and invisible networks depending on the particular expected environment. If the connection is successful in method block 750, the method terminates in method block 755. If the selected device is not available in method block 740, or the connection attempt fails in method block 750, the connection manager 260 flags the selected device as TRIED in method block 760 and returns to method block 720 to identify another candidate.

Because the connection manager 260 manages the particular communication interface 225 that is used it is able to identify problems with a particular interface 225 or with the connection. Typically, each connection service is operated by a different vendor. To facilitate troubleshooting, the connection manager 260 maintains a log in the connection database 270 of various events effecting connections over the communication interfaces 225. The connection manager 260 employs various basic utilities supplied as part of the operating system 227 or drivers, such as a ping utility or a routing table. The connection manager 260 is also capable of performing diagnostic operations to determine if the communication interfaces 225 are functional and if the associated services are reachable.

Upon automatically identifying a potential connection problem, or at the user's request, the connection manager 260 attempts to diagnose any problems with the current configuration. One outcome may be that the user needs to check the configuration of the connection manager 260 or call a technical support contact from the supplier of the connection manager 260. Another outcome may be that a particular device is not enabled properly, and that the user needs to check the configuration of the operating system 227 or call the technical support contact for the operating system vendor. Yet another outcome is that the particular communication interface 225 is not configured properly and that the user should check the configuration or call the technical support contact for the communication interface 225. Still another outcome is that the service is not properly configured and the user needs to check the service configuration or contact the first level support contact for the service provider.

Depending on the particular result of its diagnosis, the connection manager connection manager 260 accesses a list of contacts (e.g., phone, email, or web) for the entity associated with the fault in the communication configuration. Based on the current communication state, the connection manager 260 assists the user in contacting the appropriate technical support entity. The user may elect to call the identified contact, email the contact, or connect to a web service (e.g., knowledge base or on-line chat contact).

If a phone call approach is chosen, the connection manager 260 provides a script that the user may reference to help inform the technical support person the purpose of the call and the type of help needed. If one of the communication interfaces 225 is capable of placing a telephone call (e.g., the voice band modem 250) or a VOIP call may be placed over a current connection, the connection manager 260 may automatically place the call for the user.

In the case where an email contact is chosen, the connection manager 260 creates and addresses the email. The connection manager 260 includes relevant diagnostic information in the body of the email or as an attachment. Of course, if no connection is available, the connection manager 260 will notify the user that an email contact is not possible and that a phone contact should be attempted.

If the user chooses to make a web contact and connectivity is available, the connection manager 260 may provide a sample dialogue to help explain the situation and request the right help.

There are various ways the connection manager 260 may employ to diagnose connection problems. Exemplary test techniques include connectivity tests, such as ping tests and/or http test results (i.e., web browsing), operating system 227 status queries of the communication interfaces 225, device-specific diagnostics, and service-specific diagnostics.

Device tests, such as loopback and self-checking tests are common techniques known to those of ordinary skill in the art. For Wi-Fi, in particular, after the device test and before a service-specific test, the connection capability can be checked by connecting to other open Wi-Fi networks (i.e., the user may be asked to go to a new location where a network is available or to enable a new network in the current location).

Figure 8:
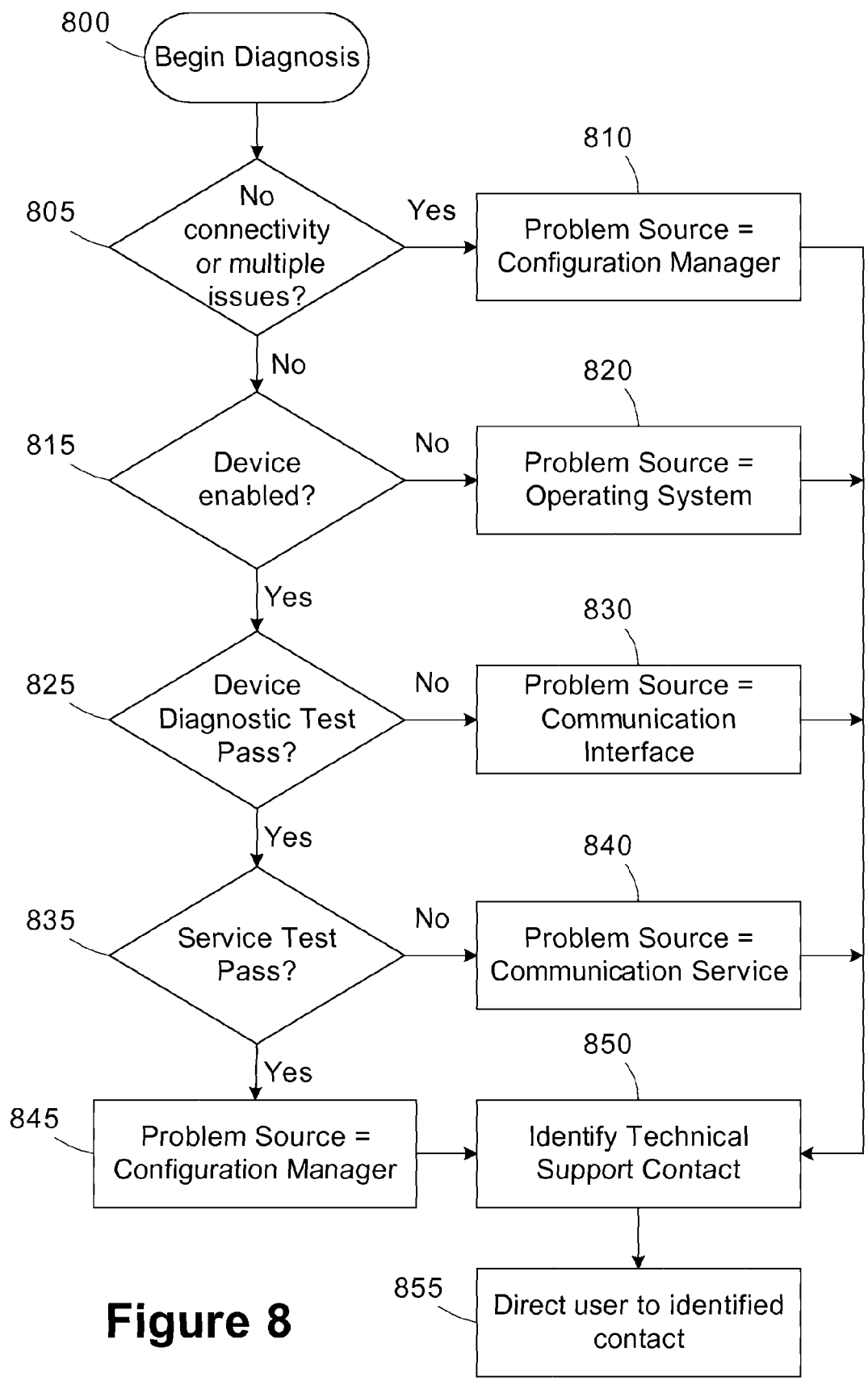
FIG. 8 is a simplified flow diagram of a method for diagnosing a problem with the mobile device and directing a user to an appropriate technical support contact.

FIG. 8 is a simplified flow diagram of a method for diagnosing a communication problem and providing the user with a targeted technical support contact. In method block 800, the connection manager 260 begins diagnosing problems with the communication configuration (e.g., automatically or responsive to user request). If the connection manager 260 determines in method block 805 that no connections can be established or that multiple problems exist, it determines that the problem may be associated with the configuration of the connection manager 260 in method block 810.

If a connection cannot be established on a single communication interface 225, the connection manager 260 checks the status of the device with the operating system 227. If the communication interface 225 is not enabled in method block 815, the connection manager determines that the problem is with the configuration of the operating system 227 in method block 820.

If the communication interface 225 is enabled, but the connection manager 260 cannot get a successful device diagnostic result in method block 825, the connection manager 260 determines that the problem is with the configuration of the communication interface 225 or with the hardware itself in method block 830.

If the device passes its diagnostic, the connection manager 260 runs a service-specific test, if applicable. For example, for a WWAN modem 230 may operate a 3G broadband mobile service tied to a single service or sold bundled with a specific service. Such a test may also be applicable to specific Wi-Fi services that have unique logon methods and user verification. If the communication interface 225 is able to connect on one service but not another, the connection manager 260 determines that the problem is with the service. If the connection manager 260 is able to get a good diagnostic result from a communication interface 225, but is unable to connect to a service using a service test in method block 835, it will infer that the problem is with the configuration of the service in method block 840.

If the various configuration, device tests, and service tests pass, and the problem has not been diagnosed, the connection manager 260 designates the connection manager as the source of the problem in method block 845.

After identifying the likely source of the problem in one of method blocks 810, 820, 830, 840, or 845, the connection manager 260 identifies a technical support contact for the identified source in method block 850. The user is directed to the identified contact in method block 855 (e.g., phone script, email, web site, etc.)

Note that the connection manager 260 limits its diagnostic reasoning to devices that the connection manager 260 is enabled to use properly. If the connection manager 260 is not setup properly to use a particular connection, then the connection manager 260 may assume the problem is with the connection manager 260.

The connection manager 260 is also able to report to the user why it has not used a particular connection at a given time and indicate that the connection does work if activated. For example, the connection manager 260 may indicate that "ServiceX" is up and functioning; however, it was not selected at this time because the LAN network is running and deemed to be a better choice because it is faster." Also, "ServiceY" was up and functional the last time is was accessed on Sunday at 9:15 pm. It is not in use now because the network "HOME_WIFI" is not sensed by the wireless device. The network "PUBLIC1" is currently selected because it is available and the fastest.

The appropriate technical support contact and contact method suggested by the connection manager 260 may be affected by the configuration of the connection manager 260 and by the manufacturer or service provider. One service provider may desire phone calls and another may desire web-based support. These preferences may be provided manually by the user at the instruction of the manufacturer or service provider, preinstalled on the mobile device 110, installed with the connection manager 260, or provided and updated through web-based updates of the connection manager 260 based on specific devices and services.

Returning to FIG. 1, the scheduler 229 may be implemented as part of the operating system 227 or as an independent application that is able to start an application or process, referred to herein as a task. The scheduler 229 may contain credentials to run the task as a particular user identity (e.g., administrator, or various users recognized by the mobile device 110). The scheduler 229 is capable of passing fixed parameters to the target task.

The scheduler 229 tracks various prerequisite conditions associated with the tasks it schedules and executes. Typically, the scheduler 229 schedules tasks based on a particular time of day. The scheduler 229 also maintains prerequisite conditions for power state and connectivity state. With regard to power state, the user may specify when scheduling a task, that the task should be blocked unless the mobile device 110 is connected to external AC power. The connectivity prerequisites define a connectivity state required for executing the task. Exemplary connectivity states include connectivity not required, connectivity required, medium-bandwidth connectivity required, high-bandwidth connectivity required, and free connectivity required.

If connectivity is not required, the task may be executed regardless of the communication state of the mobile device 110. The user may also specify the level of connectivity required from any connectivity to different speed grades (e.g., high or medium). The user may also specify that the task should not be executed unless the channel providing the connectivity does not incur usage charges.

Based on the connectivity prerequisites, the scheduler 229 determines whether a particular task should be executed. The scheduler 229 may request connectivity state information from the connection manager 260, or the connection manager 260 may broadcast is connectivity state to the operating system 227 and/or scheduler 229 when it changes.

The scheduler 229 may schedule certain tasks solely based on connectivity states rather than a particular time of day. Activities may be triggered by changes in connectivity state, such as a loss of connectivity or the establishment of connectivity. For example, the scheduler 229 may run a task, such as email synchronization, when connectivity is established and every one hour afterwards while connectivity is maintained. Other activities may be initiated in response to the level of connectivity changing. For example, the scheduler 229 may initiate a task to synchronize media files when the connectivity state changes to a high bandwidth state.

The scheduler 229 may also initiate tasks that are overdue (i.e., based on time of day requirements) due to the connectivity prerequisite not being present when the scheduler 229 first attempted to initiate the task. For example, if a task requiring connectivity was blocked at its scheduled time, the scheduler 229 can execute the task at the first opportunity when connectivity is restored. Alternatively, the user can specify that the task should be skipped and retried at its next scheduled time if the connectivity prerequisites are present at that subsequent time.

Certain software applications include internal updaters that automatically connect to the supplier's site to determine if they should update their program or data files. Typically, such programs check for updates at fixed intervals (e.g., weekly, daily, etc.). If connectivity does not exist, the update fails. However, if an update occurs during a period of limited connectivity, while the mobile device 110 is operating on battery power, or while the mobile device 110 is charging the battery, the update could have negative effects, such as long completion time, draining the battery, or lengthening the charge time.

Because the connection manager 260 and/or operating system 227 report connectivity as well as power states, the software applications may be programmed to check these power and connectivity states prior to automatically updating when the predetermined update interval arrives. Alternatively, the operating system 227 or connection manager 260 may be configured to block such updates unless the defined prerequisites are met (e.g., rich connectivity is available, sufficient battery life is available, the battery is charged and the line power is provided, etc.).

To facilitate updates, the application program may check the power and connectivity states itself or interact with the scheduler 229 to schedule an update when it is identified as being available. Hence, the application program may check for an update if connectivity was available, and responsive to finding an update, schedule a task with the scheduler 229 including the power and connectivity prerequisites. To facilitate such updates, the scheduler 229 may include an additional power state that specifies connectivity that does not significantly effect battery life or battery charge time.

Figure 9:
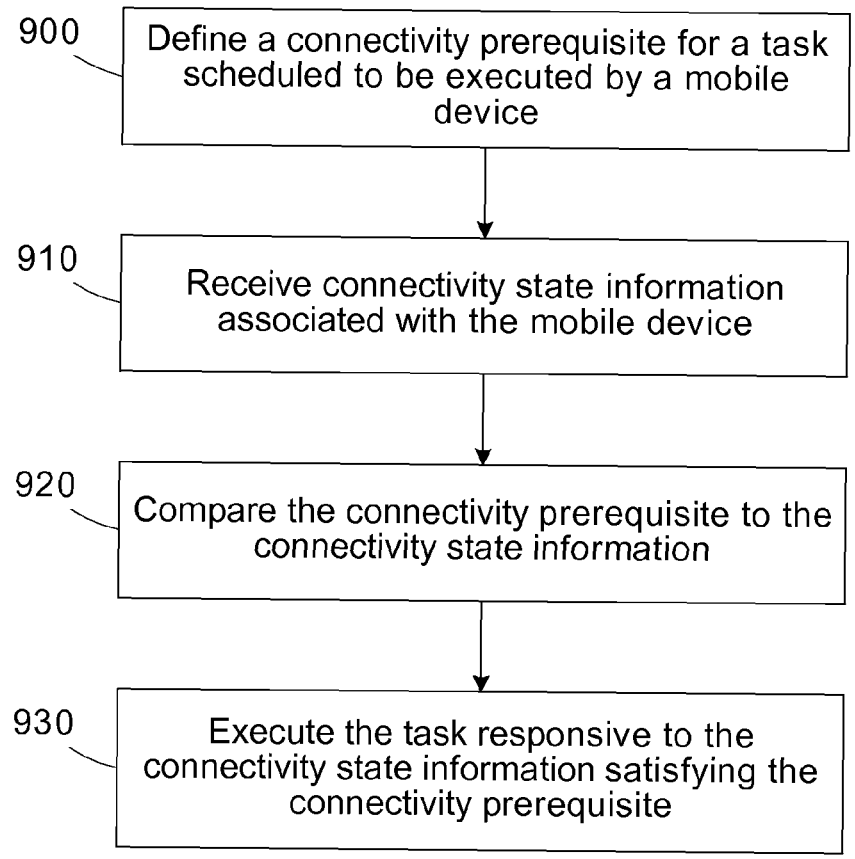
FIG. 9 is a simplified flow diagram of a method for scheduling tasks based on connectivity prerequisites.

FIG. 9 is a simplified flow diagram of a method for scheduling tasks based on connectivity prerequisites. In method block 900, a connectivity prerequisite is defined for a task scheduled to be executed by the mobile device. In method block 910, connectivity state information associated with the mobile device is received, and the connectivity prerequisite is compared to the connectivity state information in method block 920. In method block 930, the task is executed responsive to the connectivity state information satisfying the connectivity prerequisite.

Due to the number of different connection modalities managed by the connection manager 260, it is difficult for the user to associate a particular active connection with its associated service provider. To aid the user with making the association, the connection manager 260 provides branded connection messages indicating the service provider associated with the connection in use at any particular time. Such branding improves the user experience and provides the user with information regarding the particular provider should a problem arise with the service or should the user wish to change or modify the service (e.g., upgrade to faster bandwidth or unlimited usage plan).

For each service tracked in the connection database 270, the connection manager 260 stores information regarding the service provider. The service provider information could simply be the name of the provider, or it could include graphics (e.g., images or animations) associated with the service provider.

Figure 10:
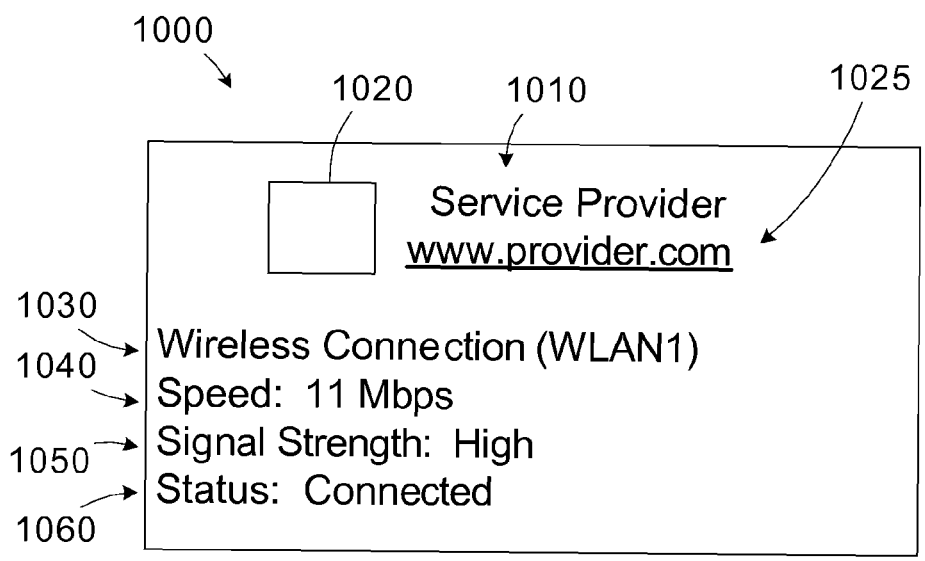
FIG. 10 is a diagram of a branded connection window.

Referring to FIG. 10, the connection manager 260 provides the user with a branded connection window 1000 that identifies the service provider associated with the current connection. In the illustrated embodiment, the branded connection window 1000 includes service provider information 1010, a service provider graphic 1020 (e.g., logo or animation), a service provider web link 1025, connection type/name information 1030 (e.g., Wireless Connection (WLAN1)), connection speed information 1040, signal strength information 1050, and connection status information 1060. In one embodiment, the branded connection window 1000 may be displayed each time the connection is changed. The particular fields provided in the branded connection window 1000 may vary depending on the particular implementation. Also, the service provider identification information may vary, and could items other than those shown or different combinations of the items shown. The service provider identification information could include an accompanying sound that is played when the branded connection window 1000 is displayed.

The branded connection window 1000 may be displayed at the bottom of the display screen (e.g., near a task or menu bar) for a specified period of time (e.g., 1-5 seconds) after a connection is activated. Alternatively, the connection manager 260 may wait until a particular user action to display the branded connection window 1000, rather than displaying the branded connection window 1000 each time a connection change occurs. For example, the branded connection window 1000 may be displayed if the user places a pointer over a connection icon indicating the status of the connection. In this manner, the user can associate the connection with its provider without the distraction of frequent popup messages.

In cases where the connection is not provided by a service vendor (e.g., home network or office network), the user may specify images or animations particular to those connections for added enjoyment or ease of identification. For example, a company logo and name may be provided by the user or retrieved from a data store of common company logos for branding the company network connection window. In the case where a particular establishment, such as a coffee shop or store, provides a service, the branded connection window 1000 may be co-branded with the name of the service and the name of the establishment providing the service.

The particular service provider information and graphics may be provided to the connection manager 260 in a variety of ways. The service provider information may be provided manually by the user or information technology department (i.e., for a corporate network), preinstalled on the mobile device 110, installed with the connection manager 260, or provided and updated through web-based updates of the connection manager 260 based on the specific devices and services included in the communication system configuration. The service provider information may also be retrieved from a web location (e.g., associated with the provider or connection manager 260 provider) to allow constant updating of the information. For example, a global website maintained by the provider of the connection manager 260 may maintain logos, graphics, sounds, etc. for each supported service provider.

Figure 11:
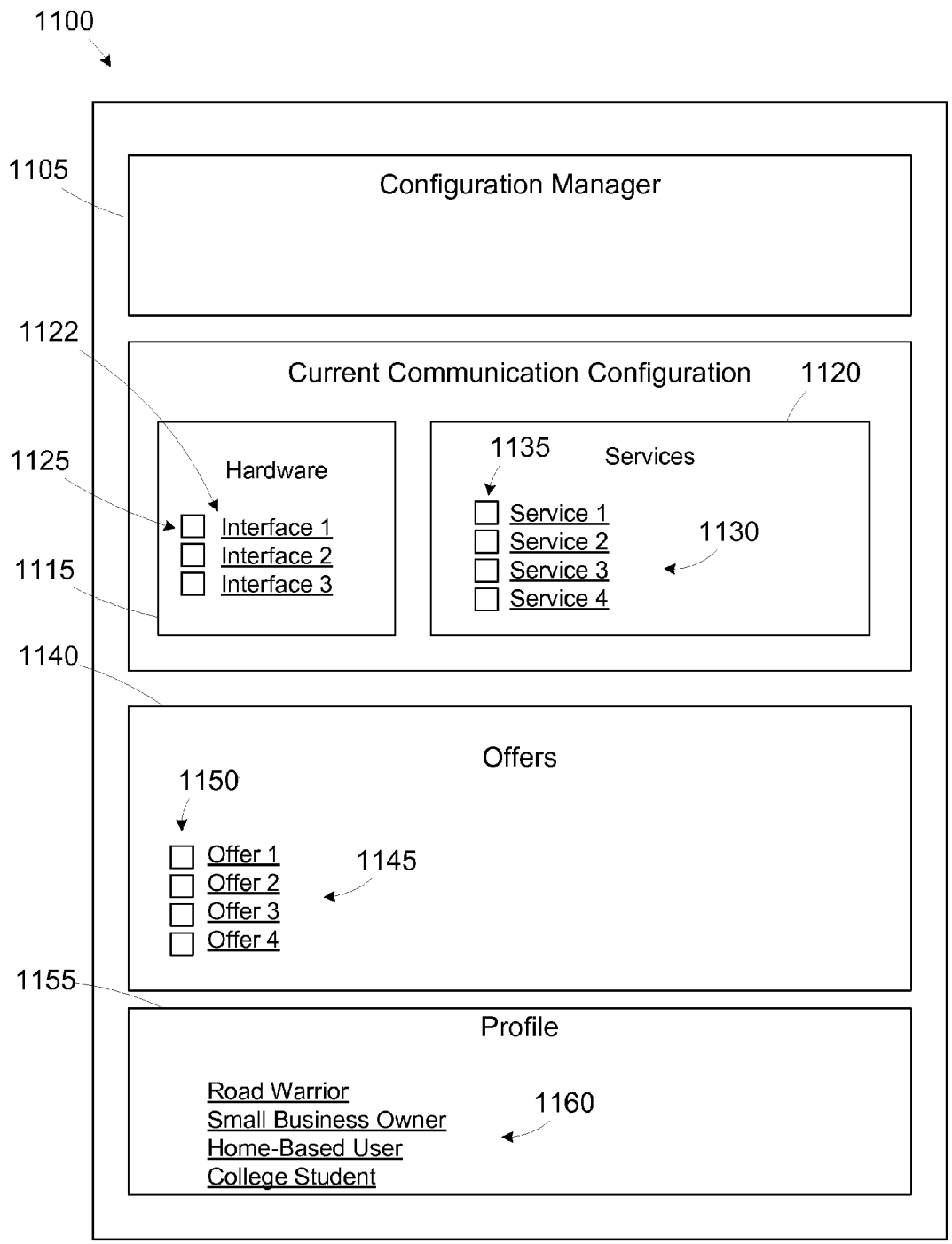
FIG. 11 is an illustrative screen display of a central connection manager portal accessed my the mobile device.

Turning now to FIG. 11, an illustrative screen display of a central connection manager portal 1100 is provided. In the illustrated embodiment, the portal 1100 is a web interface provide by the suppler of the connection manager 260. In a situation where the mobile device 110 is managed by a business for employee use only, the portal 1100 may be maintained by the business entity. For example, the central communication manager portal 1100 may be supported by the remote server 195.

The user may access the portal 1100 through various ways. For example, the branded connection window 1000 may include a web link to the connection manager portal 1100, or the connection manager 260 may periodically (e.g., weekly or monthly) ask the user if the portal 1100 should be accessed. Alternatively, the connection manager 260 may periodically check the central connection manager portal 1100 and notify the user when updated information is available.

In general, the central connection manager portal 1100 receives information from the connection manager 260 regarding the communication configuration of the mobile device 110, including the installed communication interfaces 225, services subscribed to or used in the past, etc. Based on the communication configuration, the portal 1100 provides information and updates regarding the current hardware and services installed on the mobile device 110 as well as offers for new hardware or services in which the user may be interested. For each of the various entities (i.e., connection manager, current hardware and services, and offered hardware and services), the user is able to view the latest statements and messages from the associated vendor.

Referring to FIG. 11, the central communication manager portal 1100 may include a connection manager frame 1105 providing information related to the connection manager 260 software. The user may be able to view news items, select software updates, purchase advanced features, etc. related to the connection manager 260 or its supplier. The connection manager 260 may also access the central connection manager portal 1100 without user intervention to update its program, databases, branded information, graphical user interface components, etc., as described in multiple places above.

A current configuration frame 1110 may be provided for displaying information regarding the current configuration of the communication interfaces 225 (e.g., in a hardware frame 1115) and the services employed (e.g., in a services frame 1120). For example, with respect to the hardware frame 1115, the user may be provided with links 1122 that may be followed to update software associated with the particular interface 225, review troubleshooting documentation, etc. The links 1122 may have branded icons 1125 associated with each of the communication interfaces 225. The icons 1125 may be logos, images, or animations associated with the vendors. Similarly, the services frame 1120 may provide the user with links 1130 and associated branded icons 1135. In the case described above with reference to FIG. 10, where the user specified logo or image information associated with a particular service, these items may be displayed in the current configuration frame 1110 for ease of identification.

A service offers frame 1140 may be provided to show the users additional hardware and or services that may be available to the user. Again, the offers may include links 1145 and associated branded icons 1150. The communication configuration data sent to the central connection manager portal 1100 may include location information associated with the user. Alternatively, the user may specify their location by interacting with the central connection manager portal 1100. In some cases, the mobile device 110 or one of the communication interfaces 225 may be equipped with GPS capability and can report the physical location of the user to the connection manager 260 for forwarding to the central connection manager portal 1100.

Based on the location information, the offers provided in the offers frame 1140 may be tailored to the user's current location. For example, a pay per use network may be available in the user's location. The user may select that network and receive service accordingly.

In some embodiments, the user may provide future location information to identify and subscribe to services offered in that area. For example, the user may be traveling to a different location or country outside the reach of the currently subscribed services. To ensure that connectivity is available when the user arrives at the new location, the central connection manager portal 1100 may offer services associated with new location. Such offers are tailored to the user because they evaluate the current communication configuration in conjunction with the future location. The user may actually subscribe to a service or the connection manager 260 may download settings to allow the user to contact the service provider in the future location to establish service.

In other cases, the user may arrive at a new location and then access the central connection manager portal 1100 to identify available services. For example, a free public network (e.g., in an airport) may be accessed to establish initial connectivity to allow the user to subsequently access the central connection manager portal 1100. Based on the user's communication configuration and location, the central connection manager portal 1100 can tailor the service offers to meet the user's needs.

The central connection manager portal 1100 may also include a profile frame 1155 that allows the user to select from various profiles 1160 to tailor the configuration of the connection manager 260 and/or the services offered. For example, a "Road Warrior" profile includes options for a traveling business person that does not have a central office. A "Home-Based User" may be associated with a user that operates mainly from the home environment (i.e., with little travel). Other profiles may be defined depending on the particular implementation.

Generally, the user may select a profile that best fits their usage patterns of their mobile device 110. In response to the user selecting a particular profile, the connection manager 260 may download preferences that setup to connection manager logic to more closely match their own logic in choosing various connections. This allows the user to tailor the configuration of the connection manager 260 without having to actually open the tool and change the technical settings. For example, based on the selected profile, the connection manager 260 may download Wi-Fi settings and preferences appropriate for regional or national Wi-Fi services employed by the user.

As described above, there are various situations where the user's current communication configuration is not sufficient to meet their needs. For example, the bandwidth may be insufficient or connectivity may not exist at all. The connection manager 260 identifies situations in which the user may benefit from an additional service and prompts the user to subscribe to or try an additional service. Such service prompting may be based on the user's specified location or the actual location known to the connection manager 260. The connection manager 260 accesses a geographical database (e.g., stored in the connection database 270, located at the central connection manager portal 1100, etc.) to determine the services typically offered in an area.

The connection manager 260 may also tailor connection offers based on its knowledge of the communication interfaces 225. For example, certain communication interfaces 225 may be tied to a single service provider, while others may be capable of establishing service through multiple providers. The connection manager 260 offers choices to the user depending on these particular factors.

In some cases, connectivity may be required to establish a new service. If connectivity is not present, the connection manager 260 does not prompt the users for such services. However, the connection manager 260 may inform the user that they could subscribe at a later time if connectivity were present. The connection manager 260 may interact with the scheduler 229 to schedule a subscription task at a later time should connectivity be restored.

The connection manager 260 may provide the user with details regarding the service agreements of the offered connections. For example, if a free trial period is offered, the connection manager 260 may prompt the user to join the trial. At the end of the trial period, the connection manager 260 may prompt the user to decide if the service was beneficial and provide the user the opportunity to subscribe to the service.

If no trial is available, the connection manager 260 may determine if session-based usage is available (i.e., pay for a single session at the time the session is started or pay a predetermined amount for a predetermined number of sessions in one location over some period of time). The connection manager 260 will provide the user with the subscription details and allow the user to subscribe for a session or subscribe to the contract service.

The connection manager 260 employs information on the terms of service to simplify the experience for the user. Given the large number of different offers and cost structures, a user may simply elect not to try services due to the confusion factor. Because the connection manager 260 understands the terms of service, whether a single session, a fixed period of time, a fixed amount of bandwidth per month, or unlimited, the user can make informed choices.

If the service is a single session, the connection manager 260 prompts the user before the session is terminated to ensure that the user realizes that termination will end the paid or trial session. If the session is a fixed time period (e.g., paid or trial), the connection manager 260 prompts the user prior to the expiration of the session to determine if any last uses are needed prior to termination. If the connection terms specify a fixed amount of data, the connection manager 260 will warn the user if they are near the threshold of data transfer.

Based on its knowledge of service terms and the user's usage patterns, the connection manager 260 can understand the economics of the various service offerings and inform the user of a more economical connection configuration. For example, it may be more economical to purchase a fixed contract than repeatedly buying individual sessions.

Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, pixels, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A method for scheduling tasks for execution by a mobile device, comprising:
   scheduling a task to be executed by the mobile device;
   defining a connectivity prerequisite for the task;
   receiving connectivity state information associated with the mobile device;
   comparing the connectivity prerequisite to the connectivity state information;
   executing the task responsive to the connectivity state information satisfying the connectivity prerequisite;
   rescheduling the task responsive to the connectivity state information failing to satisfy the connectivity prerequisite;
   identifying a change of connectivity state of the mobile device responsive to establishing or changing connectivity with one of a plurality of communication interfaces in the mobile device;
   updating the connectivity state information responsive to identifying the change in connectivity state;
   comparing the connectivity prerequisite to the updated connectivity state information responsive to identifying the change in connectivity state; and
   executing the task responsive to the updated connectivity state information satisfying the connectivity prerequisite after the change in connectivity state.

2. The method of claim 1, wherein the connectivity prerequisite comprises at least one of no connectivity required, connectivity required, connectivity having a bandwidth greater than a predetermined threshold required, and free connectivity required.

3. The method of claim 1, further comprising:
   defining a power state prerequisite for the task;
   receiving power state information associated with the mobile device;
   comparing the power state information to the power state prerequisite, and
   executing the task responsive to the connectivity state information satisfying the connectivity prerequisite and the power state information satisfying the power state prerequisite.

4. The method of claim 3, further comprising:
   identifying a change in a power state of the mobile device; and
   comparing the power state prerequisite to the power state information responsive to the change in power state.

5. The method of claim 3, wherein the power state prerequisite comprises at least one of external power required, minimal effect on battery life required, and minimal effect on battery charge time required.

6. The method of claim 1, further comprising:
   defining a scheduled time for the task; and
   comparing the connectivity prerequisite to the connectivity state information at the scheduled time.

7. A mobile device, comprising:
   at least one communication interface; and
   a processor coupled to the communication interface and operable to implement a scheduler, the scheduler being operable to schedule a task to be executed by the processor, define a connectivity prerequisite for the task, receive connectivity state information associated with the communication interface, compare the connectivity prerequisite to the connectivity state information, direct the processor to execute the task responsive to the connectivity state information satisfying the connectivity prerequisite, reschedule the task responsive to the connectivity state information failing to satisfy the connectivity prerequisite, identify a change of connectivity state of the mobile device responsive to establishing or changing connectivity with one of a plurality of communication interfaces in the mobile device, update the connectivity state information responsive to identifying the change in connectivity state, compare the connectivity prerequisite to the updated connectivity state information responsive to identifying the change in connectivity state, and execute the task responsive to the updated connectivity state information satisfying the connectivity prerequisite after the change in connectivity state.

8. The device of claim 7, wherein the connectivity prerequisite comprises at least one of no connectivity required, connectivity required, connectivity having a bandwidth greater than a predetermined threshold required, and free connectivity required.

9. The device of claim 7, wherein the scheduler is operable to define a power state prerequisite for the task, receive power state information associated with the mobile device, compare the power state information to the power state prerequisite, and direct the processor to execute the task responsive to the connectivity state information satisfying the connectivity prerequisite and the power state information satisfying the power state prerequisite.

10. The device of claim 9, wherein the scheduler is operable to identify a change in a power state of the mobile device and compare the power state prerequisite to the power state information responsive to the change in power state.

11. The device of claim 9, wherein the power state prerequisite comprises at least one of external power required, minimal effect on battery life required, and minimal effect on battery charge time required.

12. The device of claim 7, wherein the scheduler is operable to define a scheduled time for the task and compare the connectivity prerequisite to the connectivity state information at the scheduled time.

13. The device of claim 7, further comprising a plurality of communication interfaces and wherein the processor is further operable to implement a connection manager operable to establish connectivity for the mobile device to a remote network using the communication interfaces and provide the connectivity state to the scheduler.

14. A mobile device, comprising:
   means for scheduling a task to be executed by the mobile device;
   means for defining a connectivity prerequisite for the task;
   means for receiving connectivity state information associated with the mobile device;
   means for comparing the connectivity prerequisite to the connectivity state information;
   means for executing the task responsive to the connectivity state information satisfying the connectivity prerequisite;
   means for rescheduling the task responsive to the connectivity state information failing to satisfy the connectivity prerequisite;
   means for identifying a change of connectivity state of the mobile device responsive to establishing connectivity with one of a plurality of communication interfaces in the mobile device;
   means for updating the connectivity state information responsive to identifying the change in connectivity state;
   means for comparing the connectivity prerequisite to the updated connectivity state information responsive to identifying the change in connectivity state; and
   means for executing the task responsive to the updated connectivity state information satisfying the connectivity prerequisite after the change in connectivity state.

* * * * *

UNITED STATES PATENT AND TRADEMARK OFFICE
CERTIFICATE OF CORRECTION

PATENT NO. : 7,885,222 B2
APPLICATION NO. : 11/537521
DATED : February 8, 2011
INVENTOR(S) : Terry L. Cole It is certified that error appears in the above-identified patent and that said Letters Patent is hereby corrected as shown below:

Col. 27, line 27 (claim 2, line 2), delete "no connectivity required,".

Col. 28, line 12 (claim 8, line 2), delete "no connectivity required,".

Signed and Sealed this
Twenty-ninth Day of March, 2011

David J. Kappos
*Director of the United States Patent and Trademark Office*